(12) United States Patent
Furukawa et al.

(10) Patent No.: US 9,280,690 B2
(45) Date of Patent: Mar. 8, 2016

(54) WRITING APPARATUS, WRITING SYSTEM, AND WRITING METHOD

(71) Applicants: Takahiro Furukawa, Shizuoka (JP); Daisuke Tezuka, Tokyo (JP)

(72) Inventors: Takahiro Furukawa, Shizuoka (JP); Daisuke Tezuka, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 3 days.

(21) Appl. No.: 14/185,104

(22) Filed: Feb. 20, 2014

(65) Prior Publication Data

US 2014/0239058 A1 Aug. 28, 2014

(30) Foreign Application Priority Data

Feb. 25, 2013 (JP) ................................. 2013-034990
Dec. 4, 2013 (JP) ................................. 2013-251226

(51) Int. Cl.
*G06K 5/02* (2006.01)
*G06F 3/12* (2006.01)
*H04N 1/00* (2006.01)

(52) U.S. Cl.
CPC *G06K 5/02* (2013.01); *G06F 3/121* (2013.01); *G06F 3/1234* (2013.01); *G06F 3/1259* (2013.01); *G06F 3/1261* (2013.01);
(Continued)

(58) Field of Classification Search
CPC ..... G06K 17/00; G06K 7/10861; G06K 5/00; G06K 5/02; G06Q 10/08; G06F 3/1261; G06F 3/1259; G06F 3/121; G06F 3/1234; G06F 3/1284; H04N 1/0005; H04N 1/00047; H04N 1/00334

USPC .......................................... 235/375, 385, 437
See application file for complete search history.

(56) References Cited

U.S. PATENT DOCUMENTS 7,114,654 B2 * 10/2006 Chapman et al. ........ 235/462.01
7,114,655 B2 * 10/2006 Chapman et al. ........ 235/462.01
(Continued)

FOREIGN PATENT DOCUMENTS

EP 2 083 404 A2 7/2009
EP 2 431 186 A1 3/2012
(Continued)

OTHER PUBLICATIONS

Extended European Search Report issued Dec. 22, 2014 in Patent Application No. 14155553.2.

*Primary Examiner* — Paultep Savusdiphol
(74) *Attorney, Agent, or Firm* — Oblon, McClelland, Maier & Neustadt, L.L.P.

(57) ABSTRACT

A writing apparatus to which an external writing unit is connected comprises a writing unit that write, to a write object provided to a conveyed item, identification information thereof; a first reading unit in downstream side in a conveying direction than the writing unit, that reads identification information from the write object; a determination unit that determines whether the read identification information is consistent with identification information having to be written to the write object; and a notification unit configured to, when it is determined that identification information written to a first write object and read by the first reading unit is inconsistent with identification information having to be written to the first write object, notify the external writing unit of recovery information including the identification information having to be written to the first write object and/or a write content thereof.

12 Claims, 17 Drawing Sheets

(52) U.S. Cl.
CPC ............ *G06F3/1284* (2013.01); *H04N 1/0005* (2013.01); *H04N 1/00005* (2013.01); *H04N 1/00042* (2013.01); *H04N 1/00047* (2013.01); *H04N 1/00055* (2013.01); *H04N 1/00079* (2013.01); *H04N 1/00334* (2013.01); *H04N 2201/3205* (2013.01); *H04N 2201/3269* (2013.01)

(56) References Cited

U.S. PATENT DOCUMENTS

| | | | | |
|---|---|---|---|---|
| 7,274,286 | B2 * | 9/2007 | Tagato | .................. 340/10.52 |
| 8,915,421 | B2 * | 12/2014 | Lavi | ............... G06K 19/07716 235/375 |
| 2003/0189490 | A1 * | 10/2003 | Hogerton et al. | .......... 340/572.8 |
| 2004/0057768 | A1 * | 3/2004 | Oshino | ................... B41J 2/355 400/103 |
| 2005/0230478 | A1 * | 10/2005 | Chapman et al. | ........ 235/462.13 |
| 2005/0230479 | A1 * | 10/2005 | Chapman et al. | ........ 235/462.13 |
| 2005/0231370 | A1 * | 10/2005 | Tagato | ...................... 340/572.1 |
| 2008/0217394 | A1 * | 9/2008 | Okada | ............... H05K 13/0417 235/375 |
| 2009/0188972 | A1 | 7/2009 | Koakutsu | |
| 2011/0315755 | A1 | 12/2011 | Koakutsu | |
| 2012/0069378 | A1 * | 3/2012 | VanDemark | ............... B41J 2/32 358/1.14 |
| 2012/0162340 | A1 | 6/2012 | Furukawa et al. | |
| 2012/0243046 | A1 | 9/2012 | Koakutsu | |
| 2013/0146652 | A1 | 6/2013 | Koakutsu | |
| 2013/0182060 | A1 | 7/2013 | Furukawa et al. | |
| 2013/0201271 | A1 | 8/2013 | Furukawa | |

FOREIGN PATENT DOCUMENTS

| | | |
|---|---|---|
| JP | 63-7955 A | 1/1988 |
| JP | 63-191735 | 8/1988 |
| JP | 63-208457 | 8/1988 |
| JP | 7-206148 | 8/1995 |
| JP | 2002-230497 | 8/2002 |
| JP | 2003-054072 | 2/2003 |
| JP | 2010-211479 | 9/2010 |
| JP | 2010-280498 | 12/2010 |

* cited by examiner

Mr. RTARO
DECEMBER TO JANUARY, DELIVERY
NUMBER 0, ROOM TEMPERATURE

315  X-39  12/34  39

123-456
**DELIVERED TO
R CORPORATION**
3141592951413141592

(B)

60B (60)

Mr. RTARO
DECEMBER TO JANUARY, DELIVERY
NUMBER 0, ROOM TEMPERATURE

315  X-39  12/34  39

123-456
**DELIVERED TO
R CORPORATION**
3141592951413141592

E

WRITING APPARATUS, WRITING SYSTEM, AND WRITING METHOD

CROSS-REFERENCE TO RELATED APPLICATIONS

The present application claims priority to and incorporates by reference the entire contents of Japanese Patent Application No. 2013-034990 filed in Japan on Feb. 25, 2013 and Japanese Patent Application No. 2013-251226 filed in Japan on Dec. 4, 2013.

BACKGROUND OF THE INVENTION

1. Field of the Invention

The present invention relates to a writing apparatus, a writing system, and a writing method.

2. Description of the Related Art

Conventionally, thermo-sensitive papers have been used for the labels on which the address of an article and the name of the article and the rest are printed. For example, such thermo-sensitive labels are attached to plastic containers used in factories. The label of the thermo-sensitive paper has characteristics that the color is changed by a heat, and therefore the thermal head and the like may be utilized to write characters and/or marks thereon.

In the writing apparatus with the use of such thermal-sensitive paper, there is a rewritable type one that is able to be repeatedly written on and erased from the same thermal-sensitive paper. In the case of the use in logistics, since it is desirable that the writing and erasing be made with the label attached to the container, there is a method of printing characters and the like by emitting the laser light to the label to heat it without contact. This writing apparatus has a relay lens system for transferring an image by the laser light entered from one end of a plurality of lens systems configured with a flexible joint to the other end.

It is expected here that there are a case where the fixed information is always written for some period and a case where the information is switched and printed for every write object. While these pieces of information may be managed by the writing apparatus side such as a laser marker and the like, they are generally managed and controlled by the information processing device connected to the writing apparatus such as the laser marker via a communication mechanism such as the Ethernet (Trademark).

Here, in the conveyance system as exemplified in this context, the write abnormality may occur when a printing is made to the thermal-sensitive paper. In the case of using the laser marker for the printing, for example, it is considered that the above is caused by that the write content is not color-developed because of a shortage of energy at the printing, that the printing cannot be made because of the displacement of the attachment position of the thermal-sensitive paper from the printed surface, and that the printing cannot be made because of the abnormality in the wiring device. Therefore, it is required to detect the write abnormality in the conveyance system which includes the writing apparatus.

Further, because the conveyer may stop when the writing abnormality occurs, it is required to promptly remove the write abnormality and recover it to the normal state. The recovery here refers to re-printing (or re-attaching) the content where the write abnormality has occurred as the correct information and re-operating the conveyer by starting with the state immediately before the stoppage of the conveyer.

Here, with respect to detecting the above-described write abnormality, Japanese Laid-open Patent Publication No. 7-206148 discloses that the data of the article is represented by a code (for example, a barcode), the code is printed or attached, and the code is read and classified by a reading device (a barcode reader). When the barcode cannot be read, for example, this is determined as the write abnormality.

Further, with respect to the recovery process, the reading device and a data checking unit including a monitor camera are provided and, when an error occurs at the reading on the way of conveyance, the monitor camera is operated from the control room to project the data indication part which has not been read by the reading device. The operator in the control room then recovers the conveying operation by reading the data indication part and again inputting the data of the article to the input device.

In the case of such process, when the abnormality occurs, it is not necessary for the operator to come directly to the site and check/re-input the content of the barcode at the site, which simply requires the operation from the control room. Typically, this is highly convenient in that the recovery can be made by the operation from the control room, because the place (such as near the reading device) where the content of the barcode can be checked is often the place where it is difficult for the operator to come.

In the above process, however, the monitor camera is required to be provided in addition to the reading device, which results in the increased cost. Further, because the re-input is made by a human, there is a concern that a new abnormality such as input error at that time is likely to be caused. Furthermore, the person who is experienced in operating the data monitor camera has to be always deployed in the control room. Therefore, there is a need to solve the above problems, namely to achieve the prompt and easy recovery when the write abnormality occurs.

SUMMARY OF THE INVENTION

It is an object of the present invention to at least partially solve the problems in the conventional technology.

According to the present invention, there is provided a writing apparatus to which an external writing unit is connected, comprising: a writing unit configured to write, to a write object provided to a conveyed item conveyed in a conveying direction, at least identification information that identifies the write object; a first reading unit provided in more downstream side in a conveying direction than the writing unit and configured to read identification information from the write object; a determination unit configured to determine whether or not the identification information written to the write object and read by the first reading unit is consistent with identification information having to be written to the write object; and a notification unit configured to, when the determination unit determines that identification information written to a first write object being the write object and read by the first reading unit is inconsistent with the identification information having to be written to the first write object, notify the external writing unit of recovery information including at least one of identification information having to be written to the first write object and a write content corresponding to the identification information having to be written to the first write object.

The present invention also provides a writing system comprising a writing apparatus and a second writing unit connected to the writing apparatus, wherein the writing apparatus includes a first writing unit configured to write, to a write object provided to a conveyed item conveyed in a conveying direction, at least identification information that identifies the write object, a first reading unit provided in more downstream side in the conveying direction than the first writing unit and configured to read identification information from the write object, a determination unit configured to determine whether or not the identification information written to the write object and read by the first reading unit is consistent with identification information having to be written to the write object, and a notification unit configured to, when the determination unit determines that identification information written to a first write object being the write object and read by the first reading unit is not consistent with identification information being to be written to the first write object, notify the second writing unit of recovery information including at least one of identification information having to be written to the first write object and a write content corresponding to the identification information having to be written to the first write object, and wherein the second writing unit is provided in more downstream side in the conveying direction than the first reading unit and writes the identification information and the write content contained in the recovery information to the first write object.

The present invention also provides a writing method in a writing apparatus to which an external writing unit is connected including a writing unit configured to write, to a write object provided to a conveyed item conveyed in a conveying direction, at least identification information that identifies the write object, and a first reading unit provided in more downstream side in the conveying direction than the writing unit and configured to read identification information from the write object, the writing method comprising the steps of: determining whether or not the identification information written to the write object and read by the first reading unit is consistent with identification information having to be written to the write object; and when it is determined that identification information written to a first write object and read by the first reading unit is not consistent with identification information having to be written to the first write object, notifying the external writing unit of recovery information including at least one of identification information having to be written to the first write object and a write content corresponding to the identification information having to be written to the first write object.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 5(A) and 5(B) are an illustration of a write abnormality;

DETAILED DESCRIPTION OF THE PREFERRED EMBODIMENTS

First Embodiment

Figure 1:
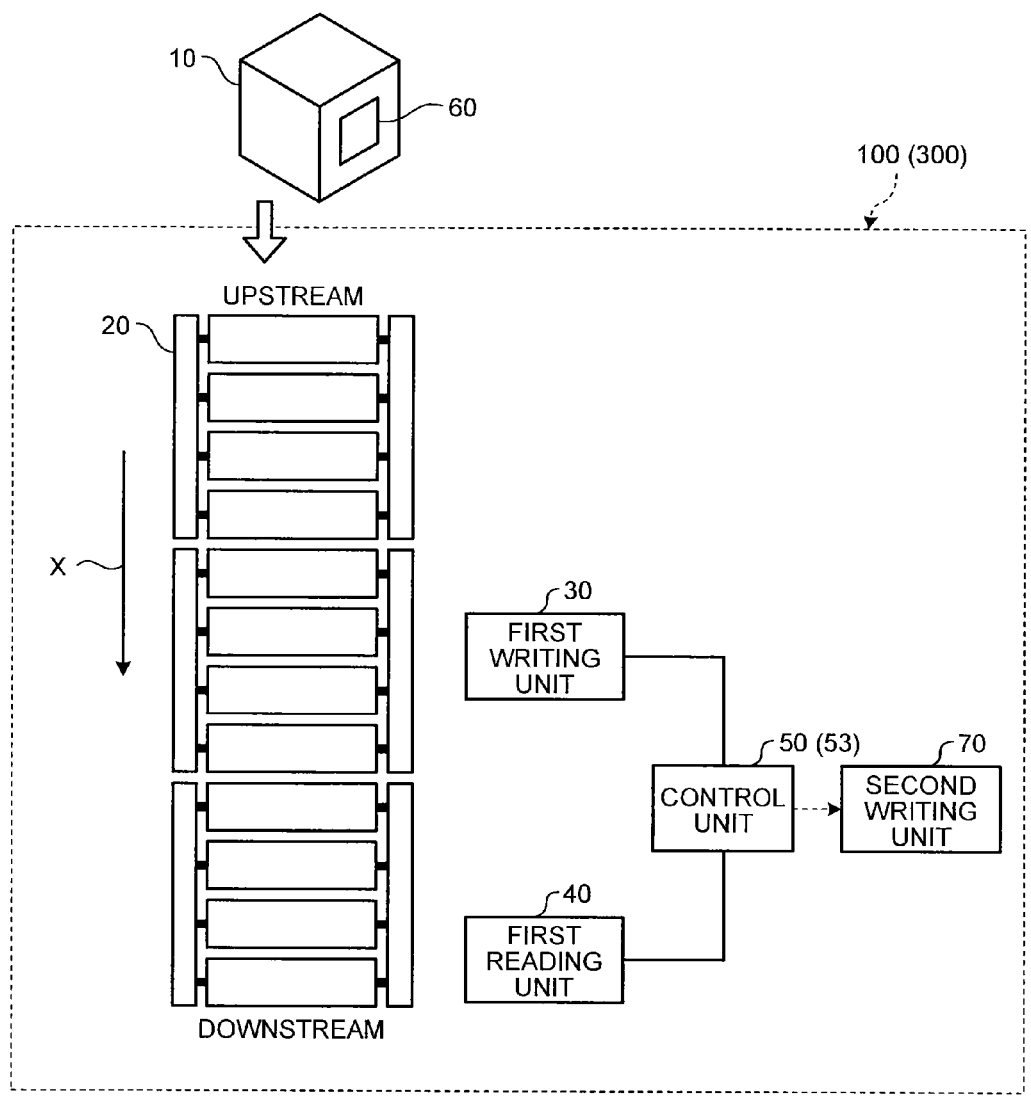
FIG. 1 is a configuration diagram illustrating a specific example of a writing apparatus.

Below, a first embodiment for implementing the present invention will be described by referring to the drawings. It is noted that the writing apparatus writes write information and the like to a write object given to a conveyed item conveyed in the conveying direction. The write information refers to one or more characters, symbols, numbers, or figures that are to be written to the write object. The write information contains at least identifying information that identifies the write object. It is noted that the write information may further include the write content corresponding to the identifying information. The write object may include a thermo-sensitive paper, a rewritable paper, a label, various memories, and the like. The various memories may include an IC (Integrated Circuit) tag, an RFID (Radio Frequency Identification) tag, and the like. Further, "write" in the present embodiment represents a printing, a depicting, and a recording to a memory.

In the present embodiment, the case where the writing apparatus uses the rewritable paper as the write object will be described as an example. Further, in the present embodiment, described will be the case where the writing apparatus prints the write information on the rewritable paper as the writing of the write information. Further, in the following description, "write" includes "print" on the rewritable paper.

FIG. 1 is a configuration diagram illustrating a specific example of a writing apparatus 100 of the present embodiment. The writing apparatus 100 includes a conveyer 20, a first writing unit 30, a first reading unit 40, and a control unit 50. The first writing unit 30 and the first reading unit 40 are electrically connected to the control unit 50. Further, the control unit 50 is electrically connected to a second writing unit 70 configured as a separate unit from the writing apparatus 100.

The conveyer 20 is driven by a not-illustrated driving unit and conveys the conveyed item from the upstream side to the downstream side along the conveying direction (in FIG. 1, see the arrowed line X direction and, hereafter, referred to as the conveying direction X). In the present embodiment, description will be provided exemplifying the case where the conveyed item is a container 10. Further, in the present embodiment, description will be provided for the case where a rewritable paper 60 is provided as the write object in the container 10.

In response that the container 10 is moved to in front of the first writing unit 30, the first writing unit 30 writes the write information to the rewritable paper 60 given to the container 10. For example, the first writing unit 30 changes the identification information contained in the write information into code data and writes it on the rewritable paper 60. The code data may be a barcode, a two-dimensional code, and the like. It is noted that, when the write content is contained in the write information, the first writing unit 30 may write the write content corresponding to the identification information on the rewritable paper 60.

The first writing unit 30 writes the write information to the rewritable paper 60 by emitting a laser light thereto.

The size of the rewritable paper 60 is A4, for example. The rewritable paper 60 is configured with four layers of a protection layer, a recording layer configured with a thermo-chromic film, a base layer, and a back coat layer in this order from the surface to the depth direction. The rewritable paper 60 is configured so as to have some degrees of strength property as well as flexibility and can be repeatedly used. Further, a part of the rewritable paper 60 is provided with a rewritable indication area as the rewritable reversible indication area.

The rewritable indication area is configured with a reversible thermal-sensitive recording medium such as a thermo-chromic film. In the reversible thermal-sensitive recording medium, there are two modes, in one of which the transparency changes reversibly depending on the temperature, and in the other of which the color tone changes reversible depending on the temperature. In the present embodiment, for the rewritable paper 60, used is the thermo-chromic film that is the reversible recording medium whose color tone changes depending on the temperature, contains a leuco dye and a developer in the recording layer, and exhibits the rewritable characteristics. That is, the color development is made by heating it up to above the melting point (for example, approximately 180 degrees centigrade) from the color erased state and cooling it from the melted state where the leuco dye and the developer are mixed. In this case, the dye and the developer are condensed with being coupled to form a state of being collected in a regular manner to some degrees, so that the color-developed state is fixed. On the other hand, the color erasing is made by heating it up to the temperature at which the color developed state is not melted (for example, 130 to 170 degrees centigrade). In this case, the collected state of the color development collapses and the developer is individually crystallized and separated to reach the color-erased state. The leuco dye is colorless or light color dye precursor and can be selected from those conventionally known without limitation in particular.

Figure 2:
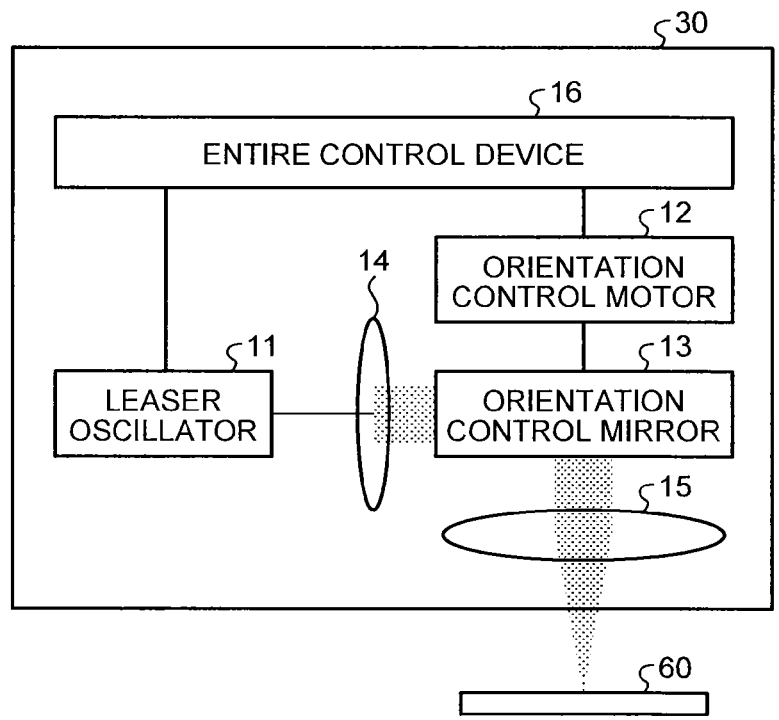
FIG. 2 is an illustration of a hardware configuration of a first writing unit.

FIG. 2 is an illustration of the hardware configuration of the first writing unit 30 that emits a laser light. As illustrated in FIG. 2, the first writing unit 30 includes an entire control device 16, a laser oscillator 11, an orientation control motor 12, an orientation control mirror 13, a spot diameter adjusting lens 14, and a focal distance adjusting lens 15. The laser oscillator 11 generates a laser light. The laser light generated by the laser oscillator 11 passes through the spot diameter adjusting lens 14 that enlarges the spot diameter of the laser light. The laser light is then adjusted for its orientation by the orientation control mirror 13 so called galvanometer mirror that controls the emission orientation of the laser, converged into the focal distance by the focal distance adjusting lens 15, and emitted to the rewritable paper 60 that is a record object.

The area of the rewritable paper 60 irradiated by the laser light has a heat and the color is developed by that heat. This color development causes the write information to be written on the rewritable paper 60. It is noted that the first writing unit 30 performs the erasing by emitting the laser whose power is suppressed and irradiation range is expanded compared to the time of the writing. The entire control device 16 moves the orientation control mirror 13 via the orientation control motor 12 to adjust the irradiation position of the laser light. Further, the entire control device 16 controls the laser oscillator 11 to control the turning ON and OFF and/or the power of the laser light. Further, the entire control device 16 is able to change the stroke width by controlling the power of the laser light. The entire control device 16 outputs the scanning signal to the orientation control motor 12 and the laser oscillator 11 to control the orientation control motor 12 and the laser oscillator 11. An example of the scanning signal will be described later.

The first writing unit 30 is required to accurately emit the laser light to the rewritable paper 60 by causing the output device such as a laser marker and the like to perform the scanning like the tracing by a pencil so that the intended character and/or figure is written on the rewritable paper 60.

Figure 3:
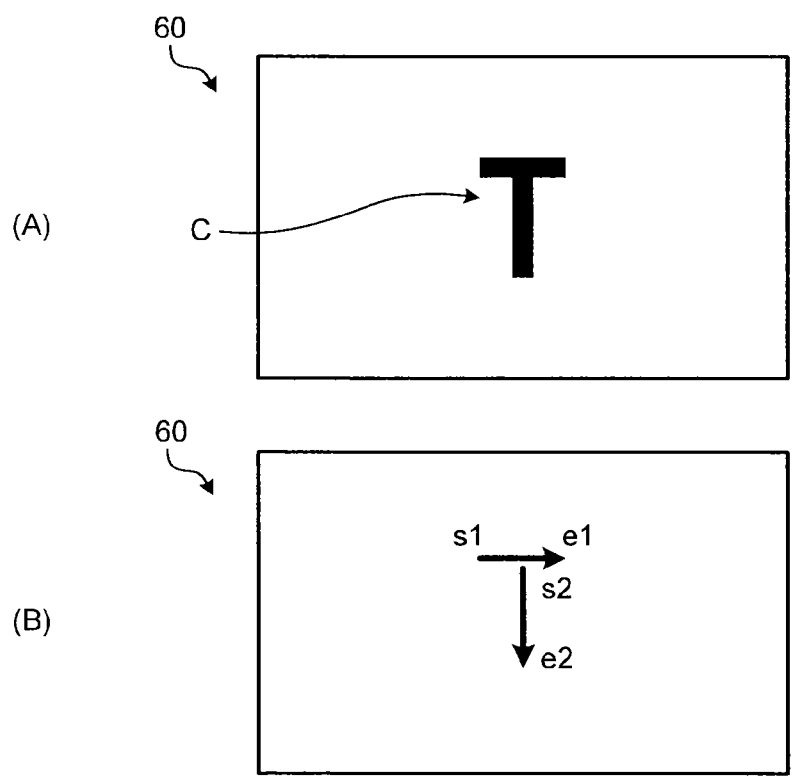
FIGS. 3(A) and 3(B) are diagrams illustrating an example of procedure in the first writing unit.

FIG. 3(A) and FIG. 3(B) represent an example of the procedure of the case where the first writing unit 30 writes a character "T" on the rewritable paper 60. In this case, the first writing unit 30 firstly moves the laser irradiation position of the first writing unit 30 to a position s1 by adjusting the galvanometer mirror, for example (see FIG. 3(B)).

Subsequently, the laser irradiation position is moved from s1 to e1 of FIG. 3(B) with keeping the laser emitted. Thereby, the lateral line of "T" is drawn on the rewritable paper 60 (see FIG. 3(A)). Subsequently, as illustrated in FIG. 3B, the first writing unit 30 moves the laser irradiation position to s2 of FIG. 3(B) without emitting the laser. Furthermore, the first writing unit 30 moves the laser irradiation position from s2 to e2 of FIG. 3(B) with keeping the laser emitted. As a result of the above operation, "T" is drawn on the rewritable paper 60 (see FIG. 3(A)).

When instructing the first writing unit 30 to write the write information, the control unit 50 transmits, to the first writing unit 30, the write instruction including the instruction signal such as "from which position to which position on the rewritable paper 60, move the irradiation position with keeping the laser emitted at the output power of X %" based on the write information, for example.

Figure 4:
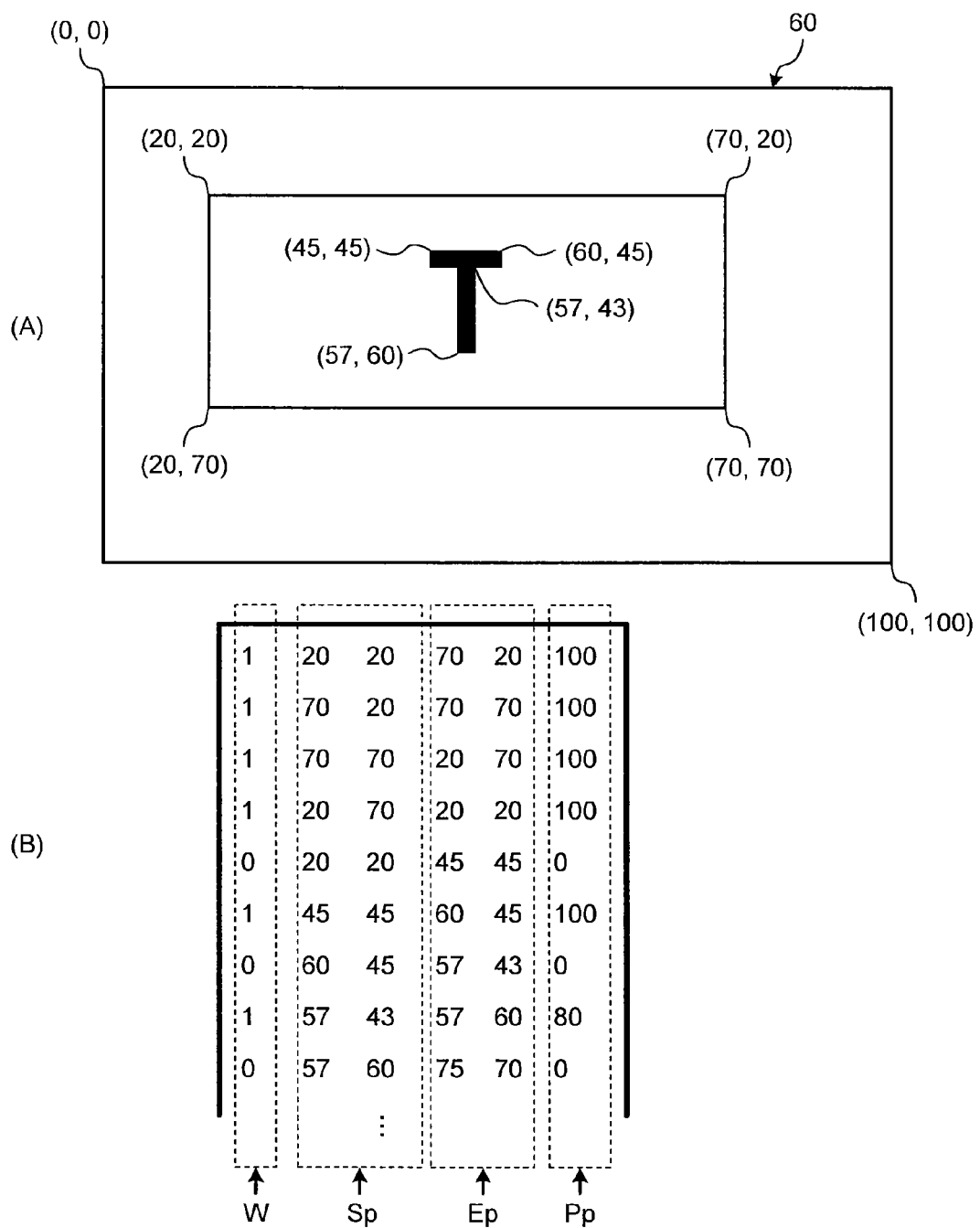
FIGS. 4(A) and 4(B) are diagrams illustrating an example of a scanning signal.

FIGS. 4(A) and 4(B) are diagrams illustrating an example of the scanning signal. FIG. 4(A) includes coordinate numbers that are used, in FIG. 4(B), as the starting point coordinate of the laser scanning and the ending point of the laser scanning. In the example illustrated in FIGS. 4(A) and 4(B), the scanning signal is made up of information of the laser ON/OFF (see W in FIG. 4(B), here, 1 represents the laser ON), information of the starting point coordinate of the laser scanning (see Sp in FIG. 4(B)), information of the ending point coordinate of the laser scanning (see Ep in FIG. 4(B)), and information of the drawing power of the laser (see Pp in FIG. 4(B)).

The entire control device 16 outputs the scanning signal according to the write information to the orientation control motor 12 and the laser oscillator 11, so that the write information (the identification information, the write content) is written on the rewritable paper 60.

Turning back to FIG. 1, the container 10 provided with the rewritable paper 60 on which the write information has been written by the first writing unit 30 is conveyed to the downstream side of the conveying direction X and reaches the installation position of the first reading unit 40. The first reading unit 40 reads the identification information from the rewritable paper 60 given to the container 10. The first reading unit 40 transmits the read identification information to the control unit 50.

The first reading unit 40 is a device that is able to read the identification information written on the rewritable paper 60. For example, it is assumed that the first writing unit 30 writes, to the rewritable paper 60, the barcode that is standardized by the Code39 (JISX 0503 specification) that is one of the barcode specifications as the identification information. In this case, the barcode reader that is capable of reading the barcode standardized at least by the Code39 may be used for the first reading unit 40.

It is noted that the case that the writing apparatus 100 writes the write information on the rewritable paper has been described in the present embodiment as described above. When the writing apparatus 100 records the write information in the memory such as the RFID, however, the recording device adapted to record the write information in the memory (the write object) may be used for the first writing unit 30 and the device capable of reading the identification information from the memory (the write object) may be used for the first reading unit 40.

Here, there is a case that the write abnormality occurs at the time when the identification information and/or the write content is written by the first writing unit 30. FIGS. 5(A) and 5(B) are diagrams illustrating the write abnormality.

As illustrated in FIG. 5(A), a rewritable paper 60A represents a normally written rewritable paper 60. As illustrating in FIG. 5(B), a rewritable paper 60B represents a rewritable paper 60 on which the write abnormality has occurred. In the rewritable paper 60B, the write abnormality has occurred in such a form that there are defects in the delivery destination and the barcode part (see E in FIG. 5(B)).

Such write abnormality can be caused by a shortage of the laser energy emitted to the rewritable paper 60 at the time of writing, the shift of the laser emitting unit due to the vibration of the conveyer 20 conveying the container 10, and so on. As illustrated in the rewritable paper 60B, the defect in the barcode causes the first reading unit 40 to read the different value from the identification information written by the first writing unit 30 as the identification information. Conventionally, the case of such write abnormality could not be recovered promptly and quickly.

Then, the control unit 50 of the writing apparatus 100 of the present embodiment has the following configuration.

Figure 6:
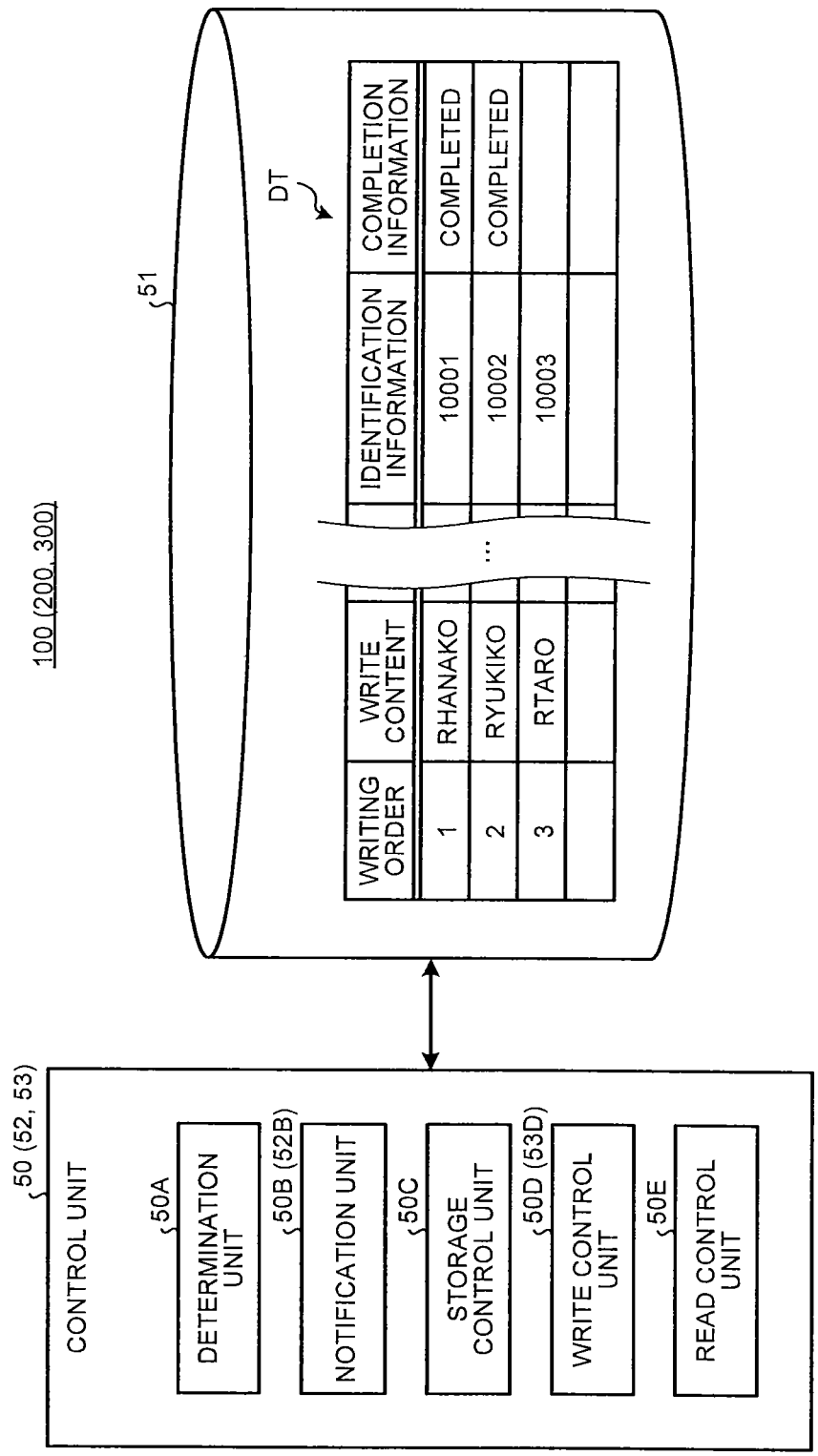
FIG. 6 is a function block diagram of a control unit.

FIG. 6 is a functional block diagram of the control unit 50. The control unit 50 is a computer including a CPU (Central Processing Unit), ROM (Read Only Memory), RAM (Random Access Memory), and so on. The control unit 50 controls the entire writing apparatus 100.

The control unit 50 is electrically connected to the first writing unit 30, the first reading unit 40, and a storage unit 51. It is noted that, in FIG. 6, the depiction of the first writing unit 30 and the first reading unit 40 are omitted (see FIG. 1).

The storage unit 51 is configured with a storage medium such as a hard disk, flash memory, and the like. The storage unit 51 stores various information such as a management table DT in which a writing order, the write content, the identification information, and completion information are associated and stored.

In the present embodiment, the storage unit 51 stores the identification information and the write content corresponding to the identification information with these pieces of information pre-sorted in the writing order according to which the first writing unit 30 performs the writing. It is noted that, as long as the storage unit 51 stores the identification information and the write content corresponding to the identification information so as to be able to identify a predetermined writing order, it is not limited to the form in which storage is made in advance in the writing order. For example, the storage unit 51 may associate and store the identification information, the write content corresponding to the identification information, and information (such as a number) that can identify the writing order. The management table DT associates in advance the writing order with each identification information such that it increases from the top identification information (the first identification information to be written) to the last identification information (the last identification information to be written).

It is noted that the identification information may be the information containing the writing order. Further, the writing order of the identification information and the write content corresponding to the identification information can be properly changed according to an operation instruction at a not-depicted input unit and the like by the user. Further, the write content and/or the identification information can also be properly changed according to the operation instruction at a not-depicted input unit and the like by the user.

The completion information is information indicating whether or not the identification information has been normally written by the first writing unit 30. When the identification information is normally written by the first writing unit 30, the storage unit 51 stores "completed" as the completion information indicating a normal writing. On the other hand, when the identification information is not normally written (in the case of an abnormal writing) by the first writing unit 30, the storage unit 51 leaves the related field empty as the completion information. It is noted that, also for the case where it is not determined whether or not the identification information is normally written, the storage unit 51 leaves the related field empty as the completion information indicating not-determined.

The control unit 50 includes a determination unit 50A, a notification unit 50B, a storage control unit 50C, a write control unit 50D, and a read control unit 50E.

The control unit 50 may implement a part of or all of the determination unit 50A, the notification unit 50B, the storage control unit 50C, the write control unit 50D, and the read control unit 50E by causing the processing device such as a CPU (Central Processing Unit) to execute a program, that is, by software, may implement it by hardware such as an IC (Integrated Circuit), or may implement it by the combination of software and hardware.

The determination unit 50A determines whether or not the identification information read by the first reading unit 40 is consistent with identification information to be written on the rewritable paper 60 on which the identification information has been written. That is, the determination unit 50A determines whether or not the identification information read by the first reading unit 40 is consistent with the identification information that the first writing unit 30 intends to write on the rewritable paper 60 on which the identification information has been written.

For example, it is assumed that the interval between the first writing unit 30 and the first reading unit 40 in the conveying direction X is shorter than the length in the conveying direction of the container 10. In this case, out of the identification information whose "completion information" is empty in the management table DT, the determination unit 50A reads the identification information corresponding to the smallest (earliest) writing order as "the identification information to be written on the rewritable paper 60 on which the identification information has been written". It is then determined whether or not this identification information is consistent with the identification information read by the first reading unit 40.

In the example illustrated in FIG. 6, the determination unit 50A reads the identification information "10003" corresponding to the writing order "3" as the identification information to be written on the rewritable paper 60 on which the identification information read by the first reading unit 40 has been written.

Here, it is assumed that the interval between the first writing unit 30 and the first reading unit 40 in the conveying direction X is longer than the length in the conveying direction of the container 10. In this case, each time the write information is written to the rewritable paper 60, the first writing unit 30 associates the information indicating "written" with the write information (the identification information, the write content) that has been written and stores it in the management table DT. Then, out of the identification information which is associated with the information indicating "written" and whose "completion information" is empty in the management table DT, the determination unit 50A reads the identification information corresponding to the smallest (earliest) writing order as "the identification information to be written on the rewritable paper 60 on which the identification information read by the first reading unit 40 has been written". It is then determined whether or not this identification information is consistent with the identification information read by the first reading unit 40.

It is noted that the determination process by the determination unit 50A is not limited to the above process. For example, the determination unit 50A pre-stores the time (referred to as the first time) from the time when the write information is written on the rewritable paper 60 by the first writing unit 30 to the time when it is conveyed to the position to be read by the first reading unit 40. Further, upon writing the write information on the rewritable paper 60, the first writing unit 30 associates the writing time with the write information (the identification information, the write content) and stores it in the management table DT. When the identification information is read by the first reading unit 40, the determination unit 50A may read the identification information corresponding to the writing time that is consistent with the time calculated by subtracting the first time from the read time as "the identification information to be written on the rewritable paper 60 on which the identification information read by the first reading unit 40 has been written", and use it for the determination.

When the inconsistency is determined by the determination unit 50A, the notification unit 50B notifies the second writing unit 70 of the recovery information (see FIG. 1). The recovery information is the identification information read by the first reading unit 40 and contains at least one of the identification information to be written on the rewritable paper 60 (first write object) in which the identification information determined to be inconsistent by the determination unit 50A is written and the write content corresponding to the identification information. It is noted that the recovery information may be the mere identification information determined to be the write abnormality and/or the number of the write information corresponding to the identification information determined to be the write abnormality, or may be the unique write command group generated from the write information group.

The second writing unit 70 may be the device that is writable to the rewritable paper 60. For example, the second writing unit 70 is a label printer. The configuration of the second writing unit 70 will be described later.

The storage control unit 50C controls the storage of various data to the storage unit 51. The write control unit 50D controls the first writing unit 30. The read control unit 50E controls the first reading unit 40.

Figure 7:
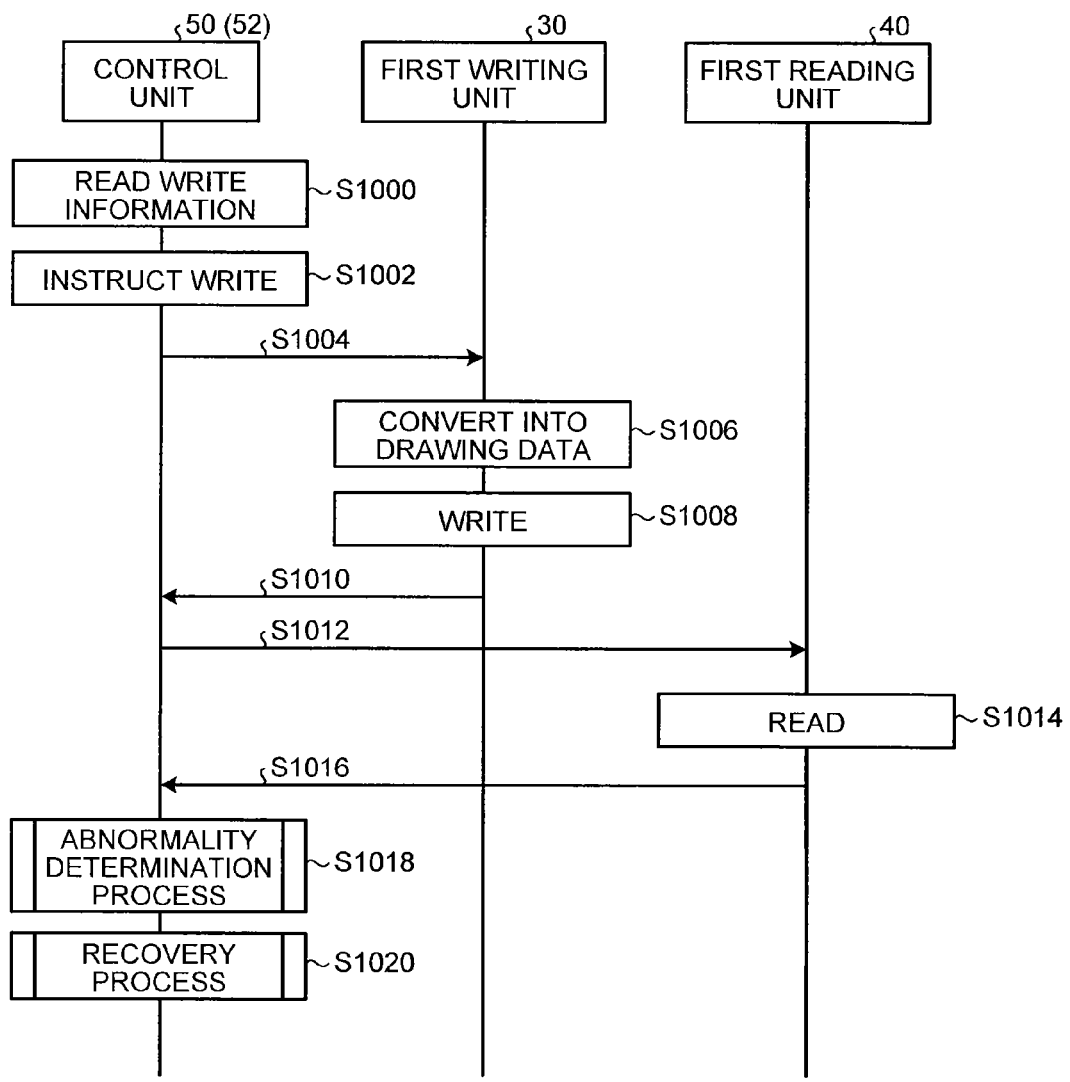
FIG. 7 is an illustration of a flow of a writing process executed by the writing apparatus.

Next, the writing process executed by the writing apparatus 100 will be described. FIG. 7 is an illustration of the flow of the writing process executed by the writing apparatus 100. It is noted that, in the illustration of FIG. 7, description will be provided assuming that the interval between the first writing unit 30 and the first reading unit 40 in the conveying direction X is shorter than the length in the conveying direction X of the container 10 (less than the width in the conveying direction X of the container 10).

Firstly, the storage control unit 50C of the control unit 50 reads, from the storage unit 51, the write information having the empty completion information and the smallest (earliest) writing order (step S1000).

Next, the write control unit 50D transmits the write instruction of the write information to the first writing unit 30 (step S1002). The process of step S1002 causes the write instruction containing the write information to be transmitted to the first writing unit 30 from the write control unit 50D of the control unit 50 (step S1004).

Next, the first writing unit 30 converts the write information contained in the accepted write instruction into the drawing data (step S1006) and writes it on the rewritable paper 60 (step S1008). Thereby, the identification information and the write content contained in the write information are written on the rewritable paper 60. Upon the completion of the writing to the rewritable paper 60, the first writing unit 30 transmits the signal indicating the write completion to the control unit 50 (step S1010).

Upon receiving the signal indicating the write completion, the control unit 50 transmits the signal indicating the start of the reading to the first reading unit 40 (step S1012).

In response that the signal indicating the start of the reading is accepted and it is detected that the container 10 has been conveyed to the position where it can be read by the first reading unit 40 by a not-depicted sensor, the first reading unit 40 reads the identification information from the rewritable paper 60 given to the container 10 (step S1014).

Next, the first reading unit 40 transmits the read identification information to the control unit 50 (step S1016).

Upon receiving the identification information from the first reading unit 40, the control unit 50 executes an abnormality determination process (step S1018) and then executes a recovery process (step S1020). The abnormality determination process and the recovery process will be described later.

Figure 8:
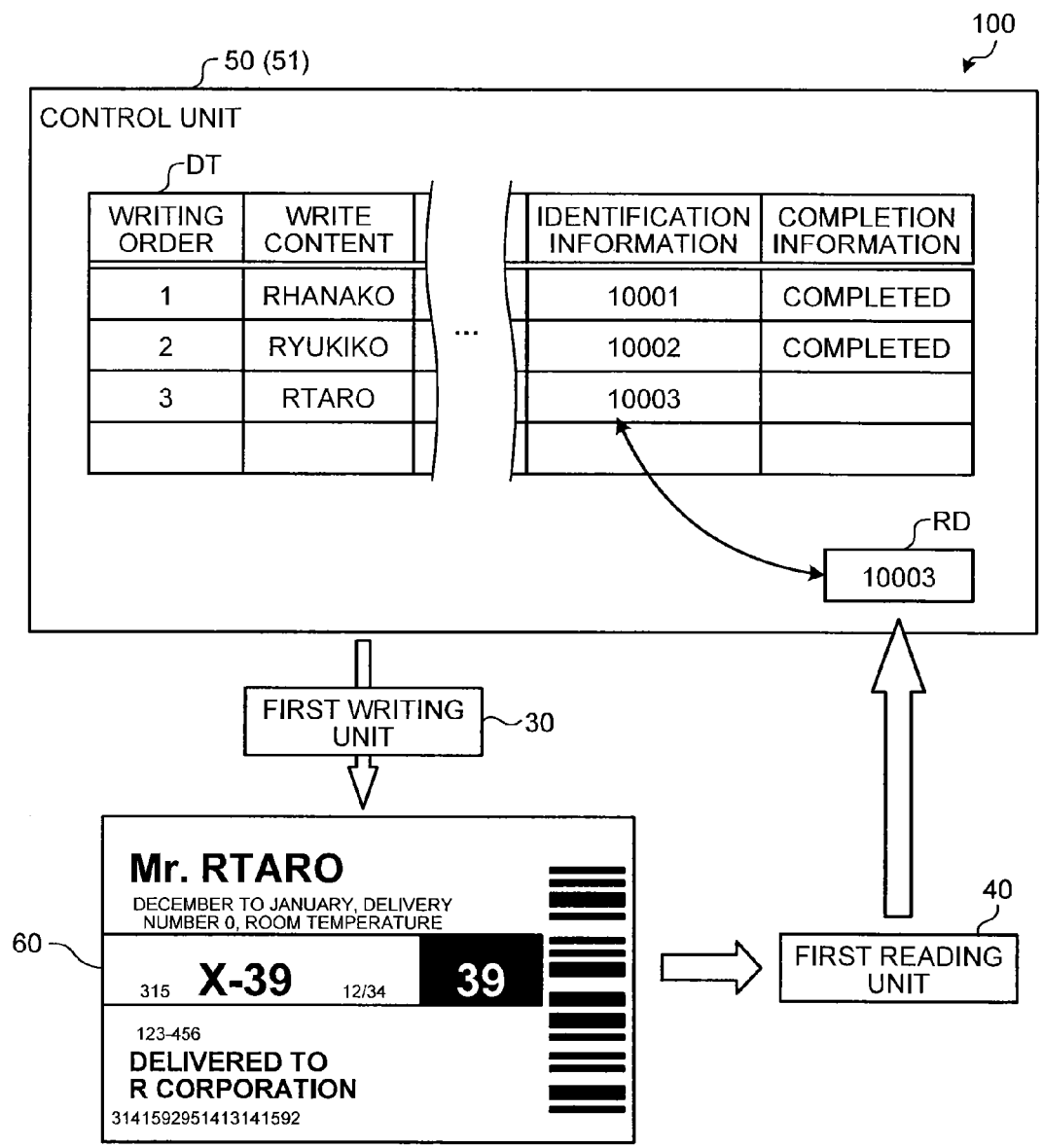
FIG. 8 is an illustration from a writing to a reading and a write abnormality determination of write information.

FIG. 8 is an illustration from the writing to the reading of the write information and the write abnormality determination. It is assumed that the management table DT illustrated in FIG. 8 is stored in the storage unit 51 connected to the control unit 50.

The control unit 50 obtains the write information (the write content and the identification information) to be written by the first writing unit 30 from the management table DT, converts it into the command that can be interpreted by the first writing unit 30, and then notifies it to the first writing unit 30.

The first writing unit 30 converts the write information obtained from the control unit 50 into the drawing data, and writes it on the rewritable paper 60. The rewritable paper 60 in which the write information has been written by the first writing unit 30 is conveyed to in front of the first reading unit 40 by the conveyer 20, the first reading unit 40 reads the identification information. The first reading unit 40 notifies the control unit 50 of the read identification information RD.

The determination unit 50A of the control unit 50 refers to the identification information of the data group that has not been referred, that is, whose field for the completion information is empty and writing order is the earliest, namely, that corresponds to the writing order "3" in FIG. 8, and the identification information RD. The determination unit 50A of the control unit 50 determines that the normal writing has been made (the writing is normal) if both data are consistent with each other as a result of the reference, while determines that the writing is abnormal if both data are inconsistent with each other or if either identification information is missing.

Figure 9:
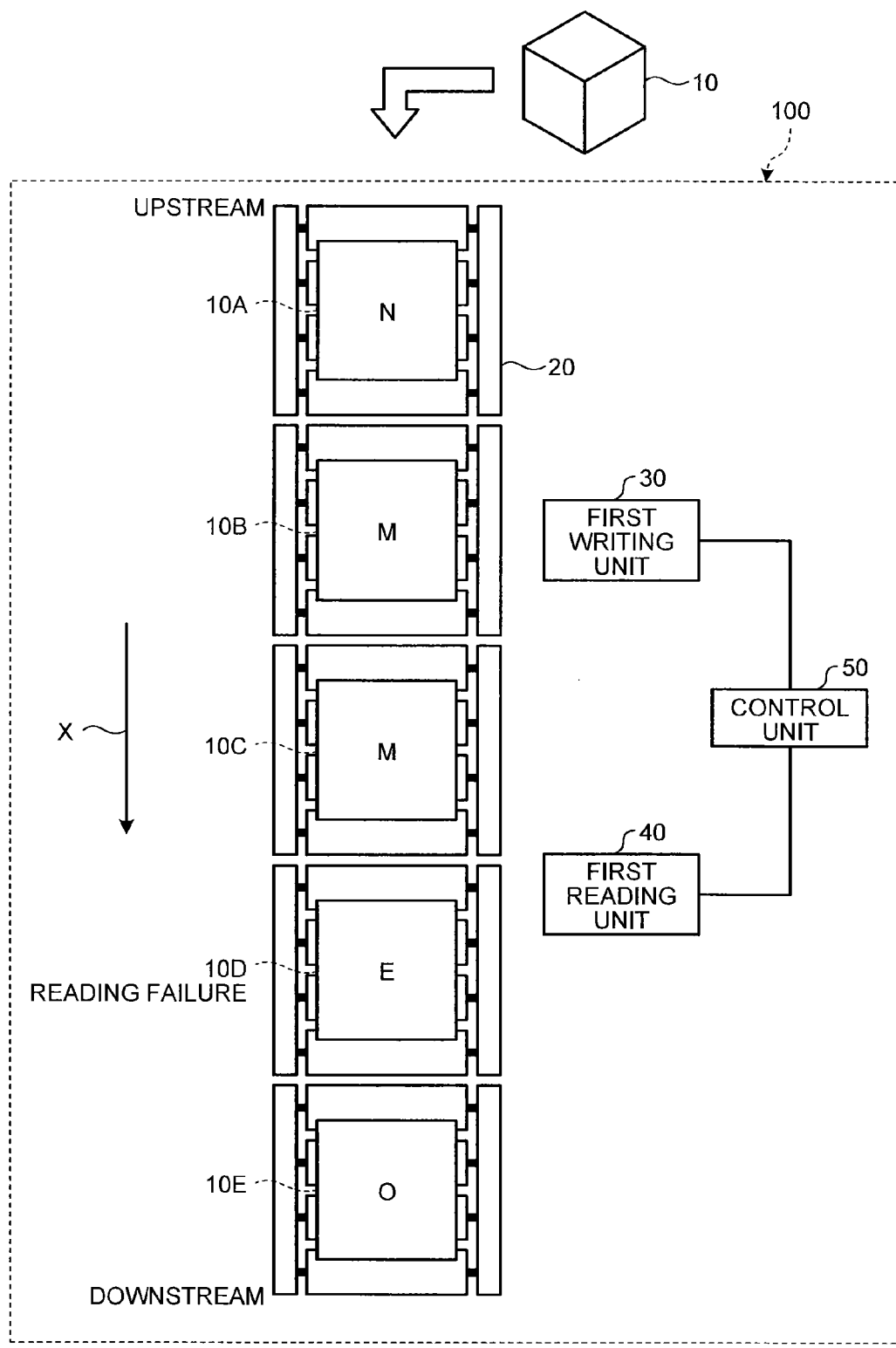
FIG. 9 is an illustration of a state where the write abnormality has occurred.

FIG. 9 is an illustration of the state where the write abnormality has occurred. In FIG. 9, a group of the containers 10 (10A to 10E) are conveyed from the upstream to the downstream in the conveying direction X. FIG. 9 illustrates the state where the identification information of the container 10D cannot be read by the first reading unit 40 and thus the abnormality is determined, and writings to the container 10B and the container 100 by the first writing unit 30 have already been completed.

Figure 10:
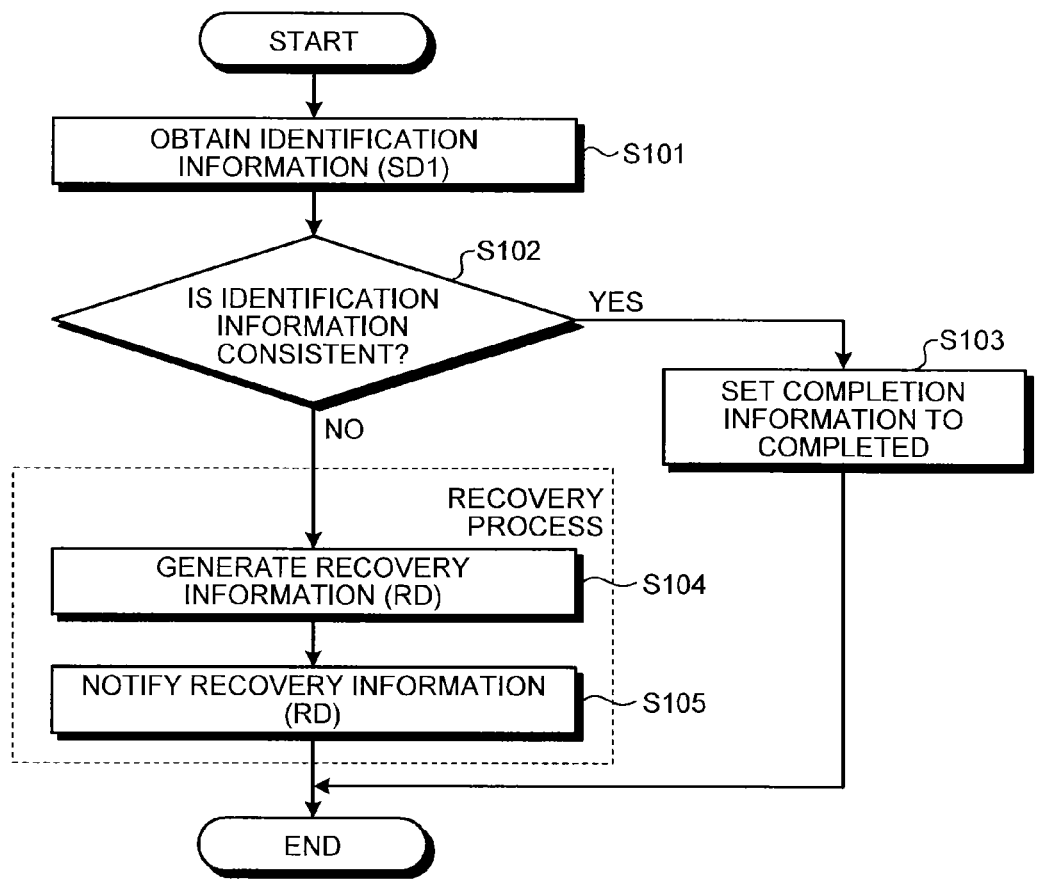
FIG. 10 is a flowchart of an abnormality determination process and a recovery process.

The flow of the process of determining the abnormality will be described below by using FIG. 10 based on the above-described state of FIG. 9. FIG. 10 is a flowchart of the abnormality determination process (step S1018) and the recovery process (step S1020) of FIG. 7.

FIG. 10 represents the process executed each time the first reading unit 40 reads the identification information from the container 10 at step S101. As illustrated in FIG. 10, the read control unit 50E obtains the identification information (SD1) read from the rewritable paper 60 by the first reading unit 40 (step S101). Next, the determination unit 50A determines whether or not the identification information (SD1) obtained at step S101 is consistent with the identification information to be written on the rewritable paper 60 on which the identification information (SD1) has been written (step S102).

If the consistency is determined by the determination unit 50A (step S102: Yes), step S103 is entered. At step S103, the storage control unit 50C stores the information indicating the completion in the field of the completion information corresponding to the identification information (SD1) obtained at step S101 (step S103) in the management table DT and the process is completed.

It is noted that the storage control unit 50C may delete the line (the writing order, the write content, the identification information, and the completion information) including the identification information obtained at step S101 in the management table DT, for example, in place of storing the information indicating the completion.

On the other hand, if the inconsistency is determined by the determination unit 50A (step S102: No), step S104 is entered. At step S104, the notification unit 50B generates the recovery information RD (step S104). The generation process of the recovery information RD has been described above and thus its description is omitted here.

It is noted that, as long as the recovery information RD includes at least one of the identification information to be written on the rewritable paper 60 (the first object to be written) on which the identification information where the inconsistency has been determined by the determination unit 50A has been written and the content to be written corresponding to that identification information, and the recovery information RD may be the number of the write information or may be the unique write command group generated from the write information. Further, the recovery information RD is desirably the information that can be used by the second writing unit 70 to be notified at subsequent step S105.

Next, the notification unit 50B notifies the recovery information RD to a preset device to be notified, and the process is completed (step S105). With respect to the preset device to be notified, any device intended to be involved in the recovery process may be set and, further, any timing for setting the device to be notified may be applied. The device to be notified is the second writing unit 70, for example.

Figure 11:
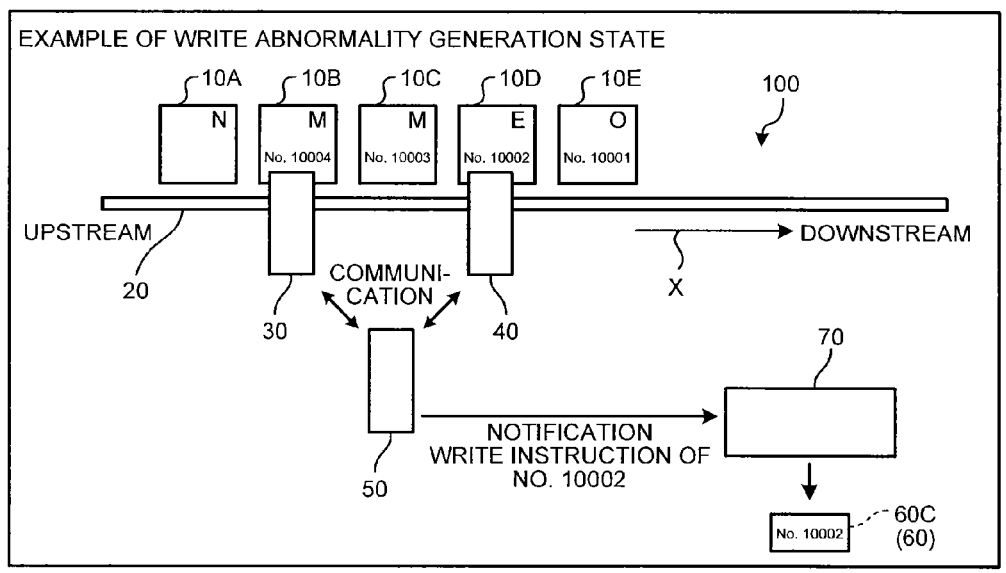
FIG. 11 is a configuration diagram of the writing apparatus.
Figure 12:
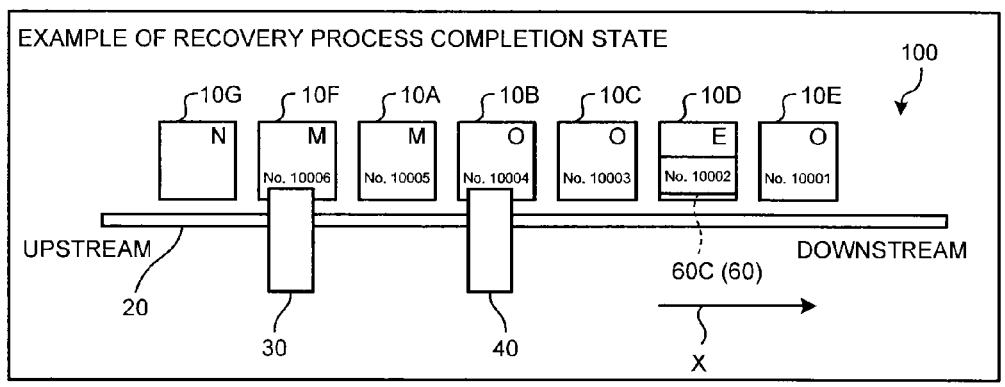
FIG. 12 is a configuration diagram of the writing apparatus.

FIG. 11 and FIG. 12 are diagrams illustrating the configuration of the writing apparatus 100 when the label printer is set as the preset device to be notified (the second writing unit 70).

The writing apparatus 100 illustrated in FIG. 11 sequentially writes the write information containing the identification information whose numerical value is incremented by one for each time the write information is written to the rewritable paper 60 (not illustrated in FIG. 11) provided to the container 10. That is, the identification information "10001", "10002", "10003", and "10004" is written on the rewritable paper 60 given to each of the containers 10E to 10B aligned from the upstream to the downstream in the conveying direction X.

Then, when the first reading unit 40 reads the identification information of the container 10D provided with the rewritable paper 60 on which the identification information "10002" is written, it is assumed that the inconsistency is determined by the determination unit 50A of the control unit 50. In this case, the notification unit 50B generates the recovery information containing the identification information "10002" as the recovery information. The notification unit 50B then notifies the second writing unit 70 of the write instruction including the recovery information containing the identification information "10002".

The label printer as the second writing unit 70 that has received the write instruction writes, on the rewritable paper 60C, the identification information "10002" contained in the recovery information. That is, in this case, the label printer as the second writing unit 70 automatically writes, on the rewritable paper 60, the identification information "10002" where the write abnormality has occurred. Therefore, the user simply performs the process of giving the container 10D in which the write abnormality has occurred the rewritable paper 60C on which the identification information "10002" has been written (see FIG. 12).

Therefore, in the writing apparatus 100 of the present embodiment, it is no longer necessary to include the step of manually inputting the identification information where the write abnormality has occurred, which can prevent the human error such as an input error that is likely to occur at the manual input.

Therefore, the writing apparatus 100 of the present embodiment allows for the prompt and easy recovery when the write abnormality occurs.

Second Embodiment

In the above-described first embodiment, the user is required to give the containers 10 the rewritable papers 60 on which the identification information has been written by the second writing unit 70. Because the containers 10 are sequentially conveyed, however, it is difficult for the user to distinguish the container 10 to give the rewritable paper 60. The writing apparatus 200 of the second embodiment (FIG. 13) is provided with the arrangement addressing this point. It is noted that, in the following embodiment, the same element as that in the first embodiment is provided with the same reference numeral and its detailed description will be omitted.

Figure 13:
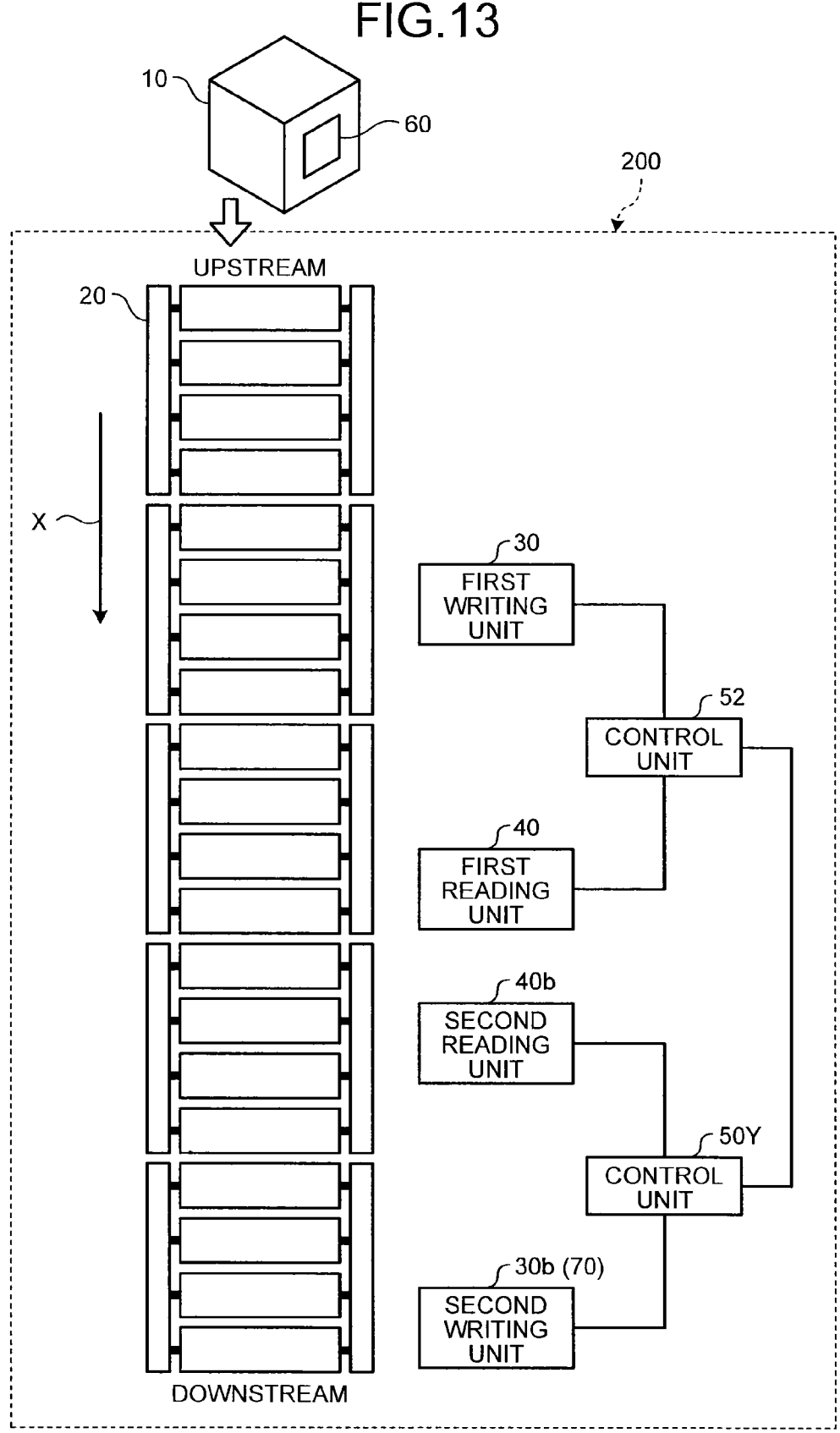
FIG. 13 is a configuration diagram illustrating a specific example of the writing apparatus.

FIG. 13 is a configuration diagram illustrating the specific example of the writing apparatus 200 of the present embodiment. The writing apparatus 200 of the present embodiment includes a conveyer 20, a first writing unit 30, a first reading unit 40, a control unit 52, a second reading unit 40b, a second writing unit 30b, and a control unit 50Y. The conveyer 20, the first writing unit 30, and the first reading unit 40 are the same as those in the first embodiment.

The first writing unit 30 and the first reading unit 40 are electrically connected to the control unit 52.

The second writing unit 30b has the same configuration as the second writing unit 70 of the first embodiment. That is, the writing apparatus 200 has the configuration integrally including the second writing unit 30b corresponding to the second writing unit 70.

The second reading unit 40b is provided in more downstream side in the conveying direction X than the first writing unit 30 and the first reading unit 40. The second writing unit 30b is provided in more downstream side in the conveying direction X than the first writing unit 30, the first reading unit 40, and the second reading unit 40b.

That is, the present embodiment is configured so that the second writing unit 30b provided separately in the downstream side in the conveying direction X is able to rewrite to the rewritable paper 60 given to the container 10 where the write abnormality has occurred in the upstream side in the conveying direction X. It is noted that the first writing unit 30 and the second writing unit 30b may be of the same model or may be of the different model. For example, the first writing unit 30 may be a laser marker and the second writing unit 30b may be an auto labeler.

The control unit 50Y is electrically connected to the second reading unit 40b and the second writing unit 30b. The control unit 50Y controls the second reading unit 40b and the second writing unit 30b. Further, the control unit 50Y is electrically connected to the control unit 52. It is noted that the control unit 52 and the control unit 50Y may be integrally configured.

FIG. 6 is a functional block diagram of the control unit 52. The control unit 52 is a computer configured including a CPU, ROM, RAM, and so on. The control unit 52 is connected to the storage unit 51. The storage unit 51 is the same as that in the first embodiment.

The control unit 52 includes a determination unit 50A, a notification unit 52B, a storage control unit 50C, a write control unit 50D, and a read control unit 50E. The determination unit 50A, the storage control unit 50C, the write control unit 50D, and the read control unit 50E are the same as those in the first embodiment.

When inconsistency is determined by the determination unit 50A, the notification unit 52B notifies the control unit 50Y of the recovery information. In the present embodiment, as an example, described will be the case where the recovery information includes first identification information, a write content corresponding to the first identification information, and second identification information. The first identification information is the identification information that the first reading unit 40 has tried to read and that is to be written on the rewritable paper 60 (the first write object) on which the identification information where the inconsistency has been determined by the determination unit 50A has been written. The second identification information is the identification information that has been written immediately before the above rewritable paper 60 by the first writing unit 30.

Upon receiving the recovery information from the control unit 52, the control unit 50Y reads the second identification information contained in the recovery information. Then, when the identification information read by the second reading unit 40b is consistent with the second identification information, the control unit 50Y transmits, to the second writing unit 30b, the write instruction of the first identification information and the write content contained in the recovery information in order to write to the rewritable paper 60 reaching the writing surface of the second writing unit 30b subsequent to the rewritable paper 60 where the identification information has been read by the second reading unit 40b.

Next, the flow of the writing process executed by the writing apparatus 200 will be described. FIG. 7 is an illustration of the flow of the writing process executed by the writing apparatus 200. It is noted that the process executed by the writing apparatus 200 is the same as that in the first embodiment. It is noted that, in the present embodiment, the process illustrated in FIG. 14 is executed in place of that in FIG. 10 as the abnormality determination process (step S1018) and the recovery process (step S1020).

Figure 14:
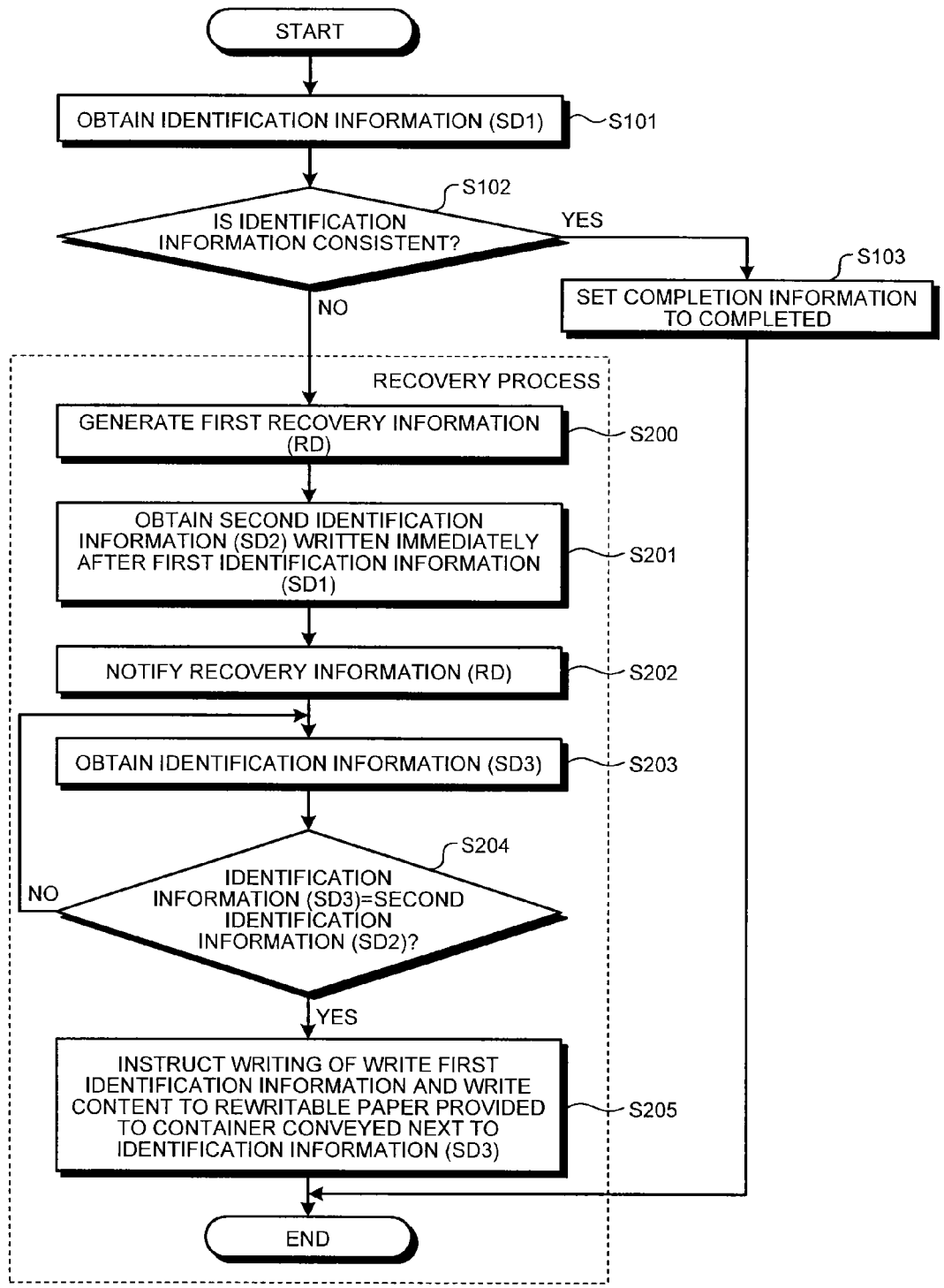
FIG. 14 is a flowchart of an abnormality determination process and a recovery process.

FIG. 14 is a flowchart of the abnormality determination process (step S1018) and the recovery process (step S1020) of FIG. 7.

It is noted that, in FIG. 14, the same process as that in FIG. 10 is provided with the same reference numeral and its detailed description will be omitted.

Firstly, the read control unit 50E obtains the identification information (SD1) read from the rewritable paper 60 by the first reading unit 40 (step S101). Subsequently, the determination unit 50A determines whether or not the identification information (SD1) obtained at step S101 is consistent with the identification information to be written to the rewritable paper 60 on which that identification information (SD1) is written (step S102). If the consistency is determined by the determination unit 50A (step S102: Yes), step S103 is entered. At step S103, the storage control unit 50C stores the information indicating the completion in the field of the completion information corresponding to the identification information (SD1) obtained at step S101(step S103) in the management table DT, and the process is completed.

On the other hand, if the consistency is determined by the determination unit 50A (step S102: No), step S200 is entered. At step S200, the notification unit 52B generates the first recovery information RD (step S200). The first recovery information RD corresponds to the recovery information RD in the first embodiment.

That is, the first recovery information RD is the information containing the identification information to be written on the rewritable paper 60 (the first write object) on which the identification information where the inconsistency has been determined by the determination unit 50A and the write content. It is noted that, as described above, the recovery information (the first recovery information) is not limited to the form containing both of the identification information and the write content, as long as it is the information containing at least one of the identification information and the write content.

Next, the notification unit 52B obtains, from the management table DT (see FIG. 6), the second identification information (SD2) written on the rewritable paper 60 by the first writing unit 30 immediately before the identification information (SD1) (hereafter, referred to as the first identification information (SD1)) obtained at step S101 (step S201).

For example, it is assumed that the first identification information (SD1) is the identification information "10003" corresponding to the writing order "3". In this case, the notification unit 52B obtains the identification information "10002" corresponding to the immediately preceding writing order "2" as the second identification information (SD2). It is noted that, as described above, it is assumed that the write information (the write content and the identification information) is listed in the writing order in the management table DT. Therefore, when the write information is not listed in the writing order, it is necessary to separately provide the means for storing the writing order of the write information.

Next, the notification unit 52B generates the recovery information RD containing the above obtained second identification information (SD2) for the first recovery information RD and notifies it to the control unit 50Y (step S202). The recovery process by the control unit 52 is completed by the above process, and the control unit 52 returns to the normal operation from step S101.

The following process is the process by the control unit 50Y. The control unit 50Y obtains the identification information (SD3) read by the second reading unit 40b (step S203). The control unit 50Y then determines whether or not the second identification information SD2 contained in the recovery information RD received from the control unit 52 is consistent with the identification information (SD3) obtained at step S203 (step S204).

The determination at step S204 is the process for determining whether or not the rewritable paper 60 given to the container 10 to be subsequently conveyed is the write object for the second writing unit 30b.

If the second identification information SD2 is inconsistent with the identification information (SD3) (step S204: No), the process returns to step S203. On the other hand, if the second identification information SD2 is consistent with the identification information (SD3) (step S204: Yes), the process proceeds to step S205.

At step S205, for the rewritable paper 60 given to the container 10 conveyed subsequent to the rewritable paper 60 on which the identification information (SD3) is written, the control unit 50Y transmits, to the second writing unit 30b, the write instruction of the first identification information (SD1) contained in the recovery information SD and the write content (step S205). The process is then completed. The process of step S205 causes the second writing unit 30b to write the first identification information (SD1) and the write content identified by the write instruction on the rewritable paper 60.

It is noted that the control unit 50Y pre-stores time T3 that is from the time when the reading of the identification information is made by the second reading unit 40b to the time when the container 10 provided with the rewritable paper 60 whose identification information has been read is conveyed to the position where the writing is made by the second writing unit 30b. Then, the control unit 50Y may transmit the above-described write instruction to the second writing unit 30b so that the first identification information (SD1) and the write content are written by the second writing unit 30b after the time period that is twice as much as the time T3 (T3×2) has elapsed from the time when the rewritable paper 60 on which the identification information consistent with the second identification information SD2 is written by the second reading unit 40b has been read by the second reading unit 40b.

Figure 15:
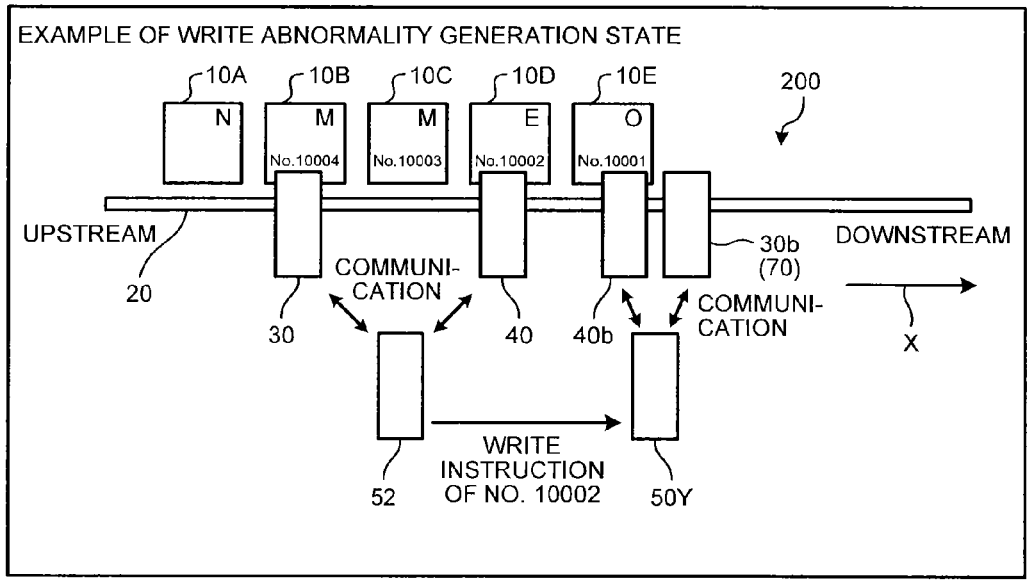
FIG. 15 is an illustration of an abnormality determination process and a recovery process.
Figure 16:
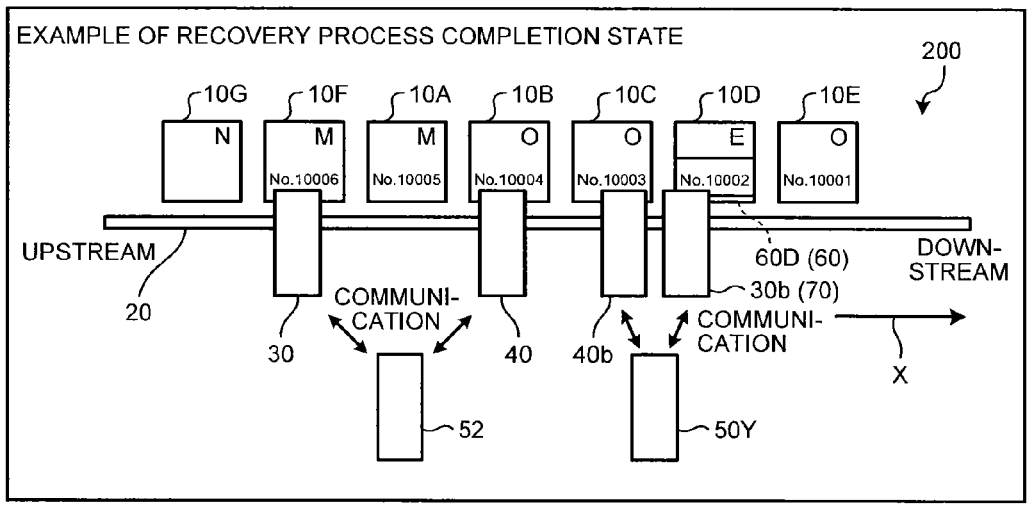
FIG. 16 is an illustration of the abnormality determination process and the recovery process.

FIG. 15 and FIG. 16 are illustrations of the movement when the abnormality determination process and the recovery process are performed in the present embodiment.

The writing apparatus 200 illustrated in FIG. 15 sequentially writes the write information containing the identification information whose numerical value is incremented by one each time the write information is written on the rewritable paper 60 (depiction is omitted in FIG. 15) given to the container 10. That is, the identification information "10001", "10002", "10003", and "10004" is written on the rewritable paper 60 given to each of the containers 10E to 10B aligned from the upstream side to the downstream side in the conveying direction X.

Then, when the identification information of the container 10D provided with the rewritable paper 60 on which the identification information "No. 10002" is written is read by the first reading unit 40, it is assumed that the inconsistency is determined by the determination unit 50A of the control unit 52. In this case, the notification unit 52B generates the recovery information containing the first identification information "10002" and immediately preceding second identification information "10001". The notification unit 52B then notifies the control unit 50Y of the write instruction including the recovery information containing the first identification information "10002", the write content, and the recovery information containing the second identification information "10001".

When the second identification information "10001" contained in the recovery information is read by the second reading unit 40b, the control unit 50Y that has received the write instruction transmits the write instruction of the first identification information "10002" and the write instruction of the write content to the second writing unit 30b with respect to the rewritable paper 60 given to the container 10D conveyed subsequent to the container 10E provided with the rewritable paper 60 on which the second identification information "10001" is written. Therefore, the second writing unit 30b writes the first identification information "10002" on the rewritable paper 60D given to the container 10D.

As discussed above, in the present embodiment, the second writing unit 30b automatically writes, on the rewritable paper 60, the identification information "10002" where the write abnormality has occurred.

Therefore, the writing apparatus 200 of the present embodiment is able to automatically rewrite the write information (the identification information, the write content) where the write abnormality has occurred.

Therefore, the writing apparatus 200 of the present embodiment is able to promptly and easily recover the case where the write abnormality has occurred.

Further, the writing apparatus 200 of the present embodiment does not require the step of manually inputting the identification information where the write abnormality has occurred, which can prevent the human error such as the input error that is likely to occur at the manual input.

It is noted that, in the present embodiment, it has been described that, with respect to the rewritable paper 60 given to the container 10 conveyed subsequent to the container 10 provided with the rewritable paper 60 on which the second identification information has been written, the write instruction of the write content including the first identification information is transmitted to the second writing unit 30b. As such, in the present embodiment, the write instruction is applied to the rewritable paper 60 "subsequent" to the rewritable paper 60 where the second identification information has been read. However, the present embodiment is not limited to the writing to the "subsequent" rewritable paper 60. That is, as long as there is a matching among the devices, the writing apparatus 200 may transmit the write instruction to the second writing unit 30b with respect to the rewritable paper 60 given to the container 10 conveyed "one after the next" container 10 provided with the rewritable paper 60 on which the second identification information has been written.

It is noted that, in the present embodiment, the second identification information (SD2) is obtained at step S201 (see FIG. 14), and the control unit 50Y determines the write object of the recovery information (the first identification information and the write content) by the identification information (SD3) obtained from the second reading unit 40b. However, this step may be omitted. In the case of the omission, when the second reading unit 40b is unable to read the identification information (SD3) from the rewritable paper 60, the control unit 50Y determines it to be the rewritable paper 60 where the write abnormality has occurred, that is, the one where the recovery information (the first identification information and the write content) should be written, and writes the recovery information (the first identification information and the write content) thereto.

Furthermore, in the present embodiment, it has been described that, in response that the control unit 50Y receives the recovery information from the control unit 52, the second writing unit 30b writes the recovery information (the first identification information and the write content). However, the second writing unit 30b may write the data for merely identifying the recovery object, for example, the identification information (SD1). In this case, the control unit 50Y needs to generate the write instruction. It is noted that, in the present embodiment, although the rewriting by the second writing unit 30b has not been described in detail, the preprocessing and the like will be additionally needed depending on the type of the second writing unit 30b. For example, when the second writing unit 30b is the laser marker, the step for once erasing the already-written information will be necessary.

Third Embodiment

Next, a writing apparatus 300 of the third embodiment (FIG. 1) will be described. It is noted that, in the following embodiment, the same part as that in the first embodiment and the second embodiment is provided with the same reference numeral and its detailed description will be omitted. In the present embodiment, with respect to the rewritable paper 60 given to the container 10 of more upstream side in the conveying direction X than the container 10 (the first conveyed object) provided with the rewritable paper 60 where the inconsistency has been determined, the position information is written that indicates the relative position relation to the first conveyed item.

FIG. 1 is a configuration diagram illustrating a specific example of the writing apparatus 300 of the present embodiment. The writing apparatus 300 includes a conveyer 20, a first writing unit 30, a first reading unit 40, and a control unit 53. The writing apparatus 300 has the same configuration as the writing apparatus 100 of the first embodiment except that it includes the control unit 53 in place of the control unit 50. The control unit 53 is electrically connected to the conveyer 20, the first writing unit 30, and the first reading unit 40. Further, the control unit 53 is electrically connected to a second writing unit 70 provided separately from the writing apparatus 300.

It is noted that, in the present embodiment, the description will be provided assuming that the interval between the first reading unit 40 and the first writing unit 30 in the conveying direction X is less than the width in the conveying direction X of the container 10 conveyed in the conveying direction X.

FIG. 6 is a functional block diagram of the control unit 53. The control unit 53 is a computer configured with a CPU, ROM, RAM, and the like. The control unit 53 is connected to a storage unit 51. The storage unit 51 is the same as that in the first embodiment.

The control unit 53 includes a determination unit 50A, a notification unit 50B, a storage control unit 50C, a write control unit 53D, and a read control unit 50E. The determination unit 50A, the notification unit 50B, the storage control unit 50C, and the read control unit 50E are the same as those in the first embodiment.

The write control unit 53D controls the first writing unit 30. Further, when inconsistency is determined by the determination unit 50A, the write control unit 53D controls the first writing unit 30 such that, with respect to the rewritable paper 60 given to the container 10 in more upstream side in the conveying direction X than the container 10 (the first conveyed item) provided with the rewritable paper 60 where the inconsistency has been determined, the position information indicating the relative position relation to the first conveyed item is written together with the write information.

Figure 17:
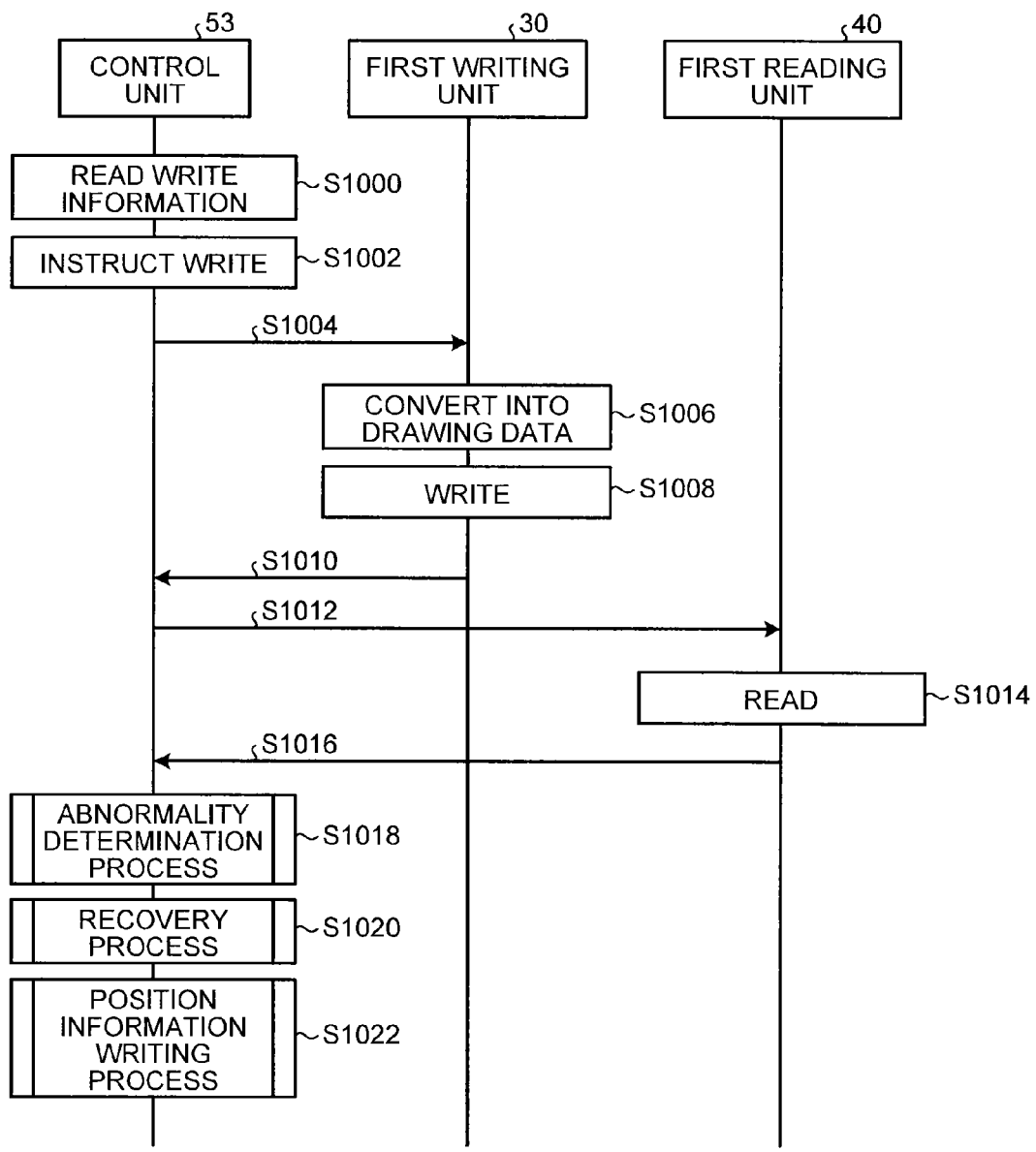
FIG. 17 is an illustration of a flow of a writing process.

Next, the flow of the writing operation executed by the writing apparatus 300 will be described. FIG. 17 is an illustration of the flow of the write process executed by the writing apparatus 300. It is noted that the writing apparatus 300 executes the process of step S1000 to step S1020 similarly to the first embodiment.

Figure 18:
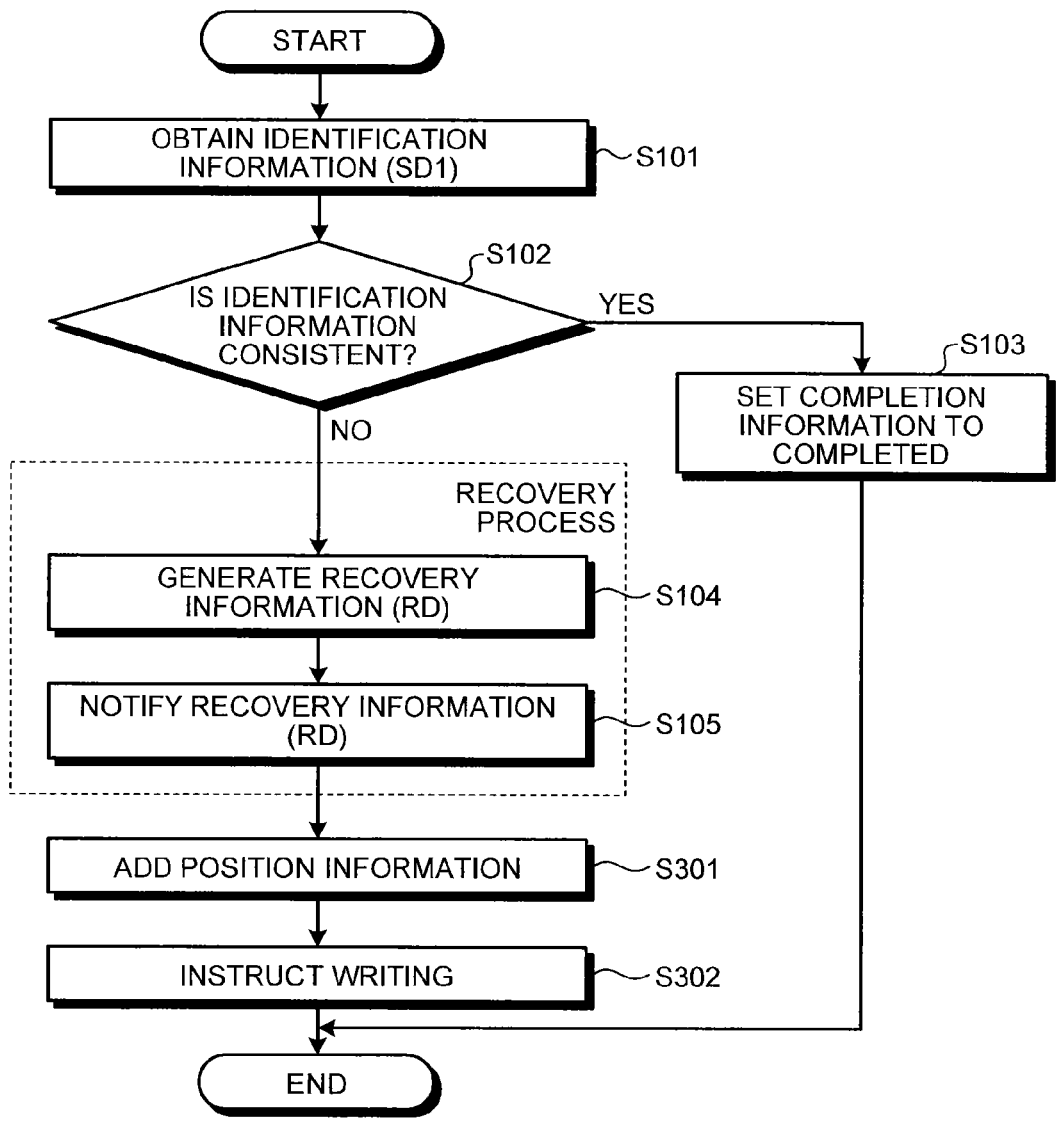
FIG. 18 is a flowchart of the abnormality determination process, the recovery process, and a position information writing process.

In the present embodiment, the process illustrated in FIG. 18 in place of FIG. 10 is executed as the abnormality determination process (step S1018) and the recovery process (step S1020). Further, in the present embodiment, the control unit 53 executes the position information writing process (step S1022) subsequent to the recovery process (step S1020).

FIG. 18 is a flowchart of the abnormality determination process (step S1018), the recovery process (step S1020), and the position information writing process (step S1022) of FIG. 7.

It is noted that, in FIG. 18, the same process as in FIG. 10 is provided with the same reference numeral and its detailed description will be omitted.

Firstly, the writing apparatus 300 performs the process of step S101 to step S105 similarly to the first embodiment. Next, the write control unit 53D adds the position information to the write information (the identification information and the write content) to be written to the rewritable paper 60 conveyed to the first writing unit 30 subsequent to the rewritable paper 60 where the inconsistency has previously been determined by the determination unit 50A (step S301). The position information indicates the relative position to the container 10 (the first conveyed object) provided with the rewritable paper 60 that has previously been determined to be inconsistent by the determination unit 50A.

The form of the "position information" is not limited, as long as it is the information that indicates the relative position to the container 10 (the first conveyed object) provided with the rewritable paper 60 where the inconsistency has previously been determined by the determination unit 50A. For example, it may be a mark and the like that can identify the container 10 (the first conveyed object) provided with the rewritable paper 60 where the inconsistency has previously been determined by the determination unit 50A, and it may be any information that can identify that container 10. The position information may be, for example, an arrowed line and/or a character indicating the container 10 neighboring in the downstream side in the conveying direction X.

Next, the write control unit 53D transmits, to the first writing unit 30, the write instruction of the write information (the identification information and the write content) added with the position information (step S302). The current routine then ends. The first writing unit 30 that has received the write instruction writes the identification information, the write content, and the position information included in the write instruction on the rewritable paper 60 conveyed to the set position of the first writing unit 30.

As discussed above, the writing apparatus 300 writes the position information indicating the relative position relation to the container 10 provided with the rewritable paper 60 that has been determined to be inconsistent together with the write information (the identification information and the write content), with respect to the rewritable paper 60 given to the container 10 in more upstream side in the conveying direction X than the container 10 provided with the rewritable paper 60 where the inconsistency has previously been determined by the determination unit 50A.

Figure 19:
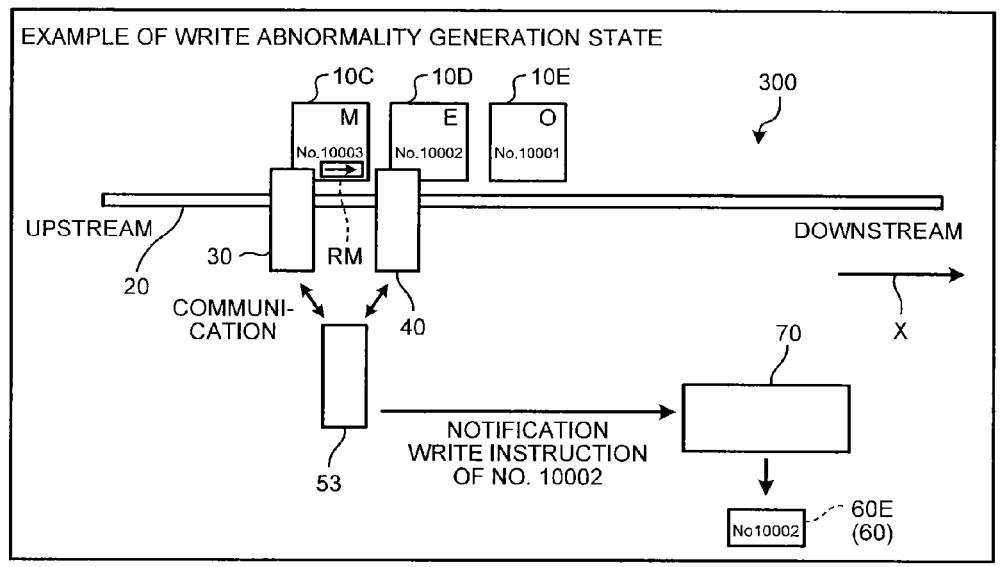
FIG. 19 is an illustration of a flow of the process by the writing apparatus.
Figure 20:
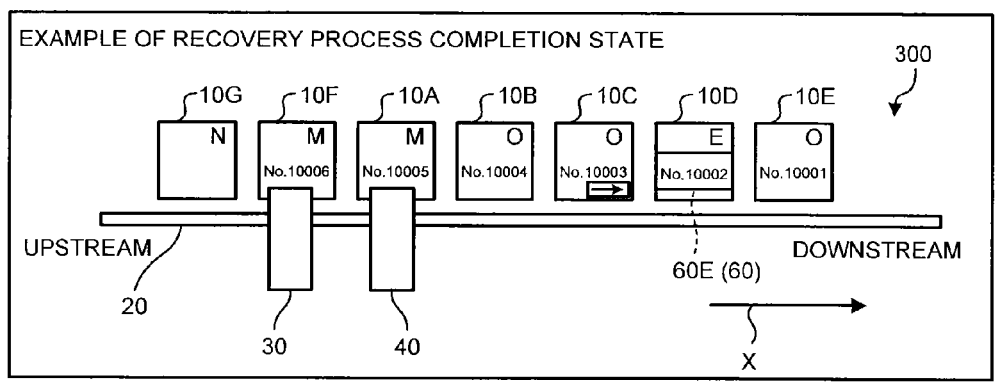
FIG. 20 is an illustration of a flow of the process by the writing apparatus.

FIG. 19 and FIG. 20 are illustrations of the flow of the process by the writing apparatus 300.

With respect to the rewritable paper 60 (depiction is omitted in FIG. 19) given to the container 10, the writing apparatus 300 illustrated in FIG. 19 sequentially writes the write information containing the identification information whose numerical value is incremented by one each time the write information is written. That is, the identification information "10001" and "10002" is written to the rewritable paper 60 given to each of the containers 10E and 10D aligned from the upstream side to the downstream side in the conveying direction X.

Then, when the identification information of the container 10D provided with the rewritable paper 60 on which the identification information "10002" has been written is read by the first reading unit 40, it is assumed that the inconsistency is determined by the determination unit 50A of the control unit 53. In this case, the write control unit 53D controls the first writing unit 30 to write the position information RM indicating the relative position relation to the container 10D along with the write information containing the identification information (the identification information "10003") with respect to the rewritable paper 60 given to the container 10C in more upstream side in the conveying direction X than the container 10D provided with the rewritable paper 60 where the inconsistency has been determined.

Therefore, the identification information "10003" and the position information RM (the arrowed line indicating the container 10D in FIG. 19) are written on the rewritable paper 60 given to the container 10C.

Further, similarly to the first embodiment, the notification unit 50B generates the recovery information containing the identification information "10002" as the recovery information. The notification unit 50B then notifies the second writing unit 70 of the write instruction including the recovery information containing the identification information "10002".

The label printer as the second writing unit 70 that has received the write instruction writes the identification information "10002" contained in the recovery information on the rewritable paper 60E. Therefore, the user may simply perform the process of giving the container 10D where the write abnormality has occurred the rewritable paper 60E on which the identification information "10002" has been written (see FIG. 20).

At this time, the position information RM (the arrowed line indicating the container 10D in FIG. 20) is written on the rewritable paper 60 (depiction is omitted in FIG. 20) given to the container 10C located in the upstream side of the container 10D in the conveying direction X. This allows the user to easily identify the container 10D that is to be provided with the rewritable paper 60E by checking the position information.

It is noted that, in the present embodiment, the description has been provided assuming that the interval between the first reading unit 40 and the first writing unit 30 in the conveying direction X is less than the width in the conveying direction X of the container 10 conveyed in the conveying direction X. In the case that the interval between the first reading unit 40 and the first writing unit 30 in the conveying direction X is larger than the width in the conveying direction X of the container 10 conveyed in the conveying direction X, however, the write control unit 53D may create the position information so that the information indicating the relative position relation to the container 10 (the first conveyed object) provided with the rewritable paper 60 where the inconsistency has previously been determined by the determination unit 50A is subsequently written on the rewritable paper 60 that is the write object for the first writing unit 30.

For example, it may be a mark and the like that indicates the relative position relation between the container 10 provided with the rewritable paper 60 where the inconsistency has previously been determined by the determination unit 50A and the container 10 provided with the rewritable paper 60 that is the object to be subsequently written by the first writing unit 30. Further, the position information RM may be the human-readable character that can be read by a human, may be non-human-readable character that can be interpreted by a machine only, or may be both of them.

As described above, the writing apparatus 300 of the present embodiment is able to write the position information indicating the relative position relation to the container 10 provided with the rewritable paper 60 where the write abnormality has occurred with respect to the rewritable paper 60 given to the container 10 in more upstream side in the conveying direction X than the container 10 provided with the rewritable paper 60 where the write abnormality has occurred.

Therefore, the writing apparatus 300 of the present embodiment is able to promptly and easily recover the case where the write abnormality occurs.

Next, described will be the second writing unit 70 used in the above-described embodiment.

Figure 21:
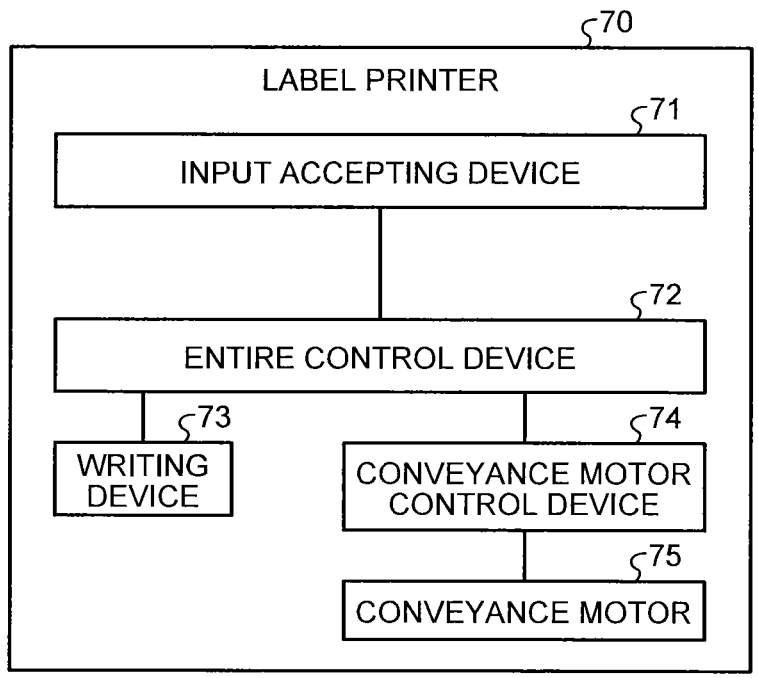
FIG. 21 is a schematic diagram of a second writing unit 70.

FIG. 21 is a schematic diagram illustrating an example of the second writing unit 70 configured as a label printer.

As illustrated in FIG. 21, the second writing unit 70 includes an input accepting device 71, an entire control device 72, a writing device 73, a conveyance motor control device 74, and a conveyance motor 75. The conveyance motor control device 74 drives the conveyance motor 75 to convey the rewritable paper 60 (depiction is omitted in FIG. 21) that is the object to be printed. The writing device 73 writes the data based on the setting accepted by the input accepting device 71 and/or the information obtained from a not-depicted I/F on the rewritable paper 60 that has reached the writing device 73. Upon the completion of the writing to the rewritable paper 60, the conveyance motor control device 74 again drives the conveyance motor 75, and supplies the written rewritable paper 60 from a not-depicted feeding port. The entire control device 72 controls the series of the above operations.

That is, the second writing unit 70 performs the writing on the rewritable paper 60, and the user directly attaches the rewritable paper 60 supplied from the not-depicted feeding port to the container 10 where the write abnormality has occurred. Moreover, when the second writing unit 70 is of the auto labeler type, the rewritable paper 60 supplied from the feeding port is directly attached to the rewritable paper 60 where the write abnormality has occurred by the not-depicted label attaching device that is the auto labeler, without via the user.

Figure 22:
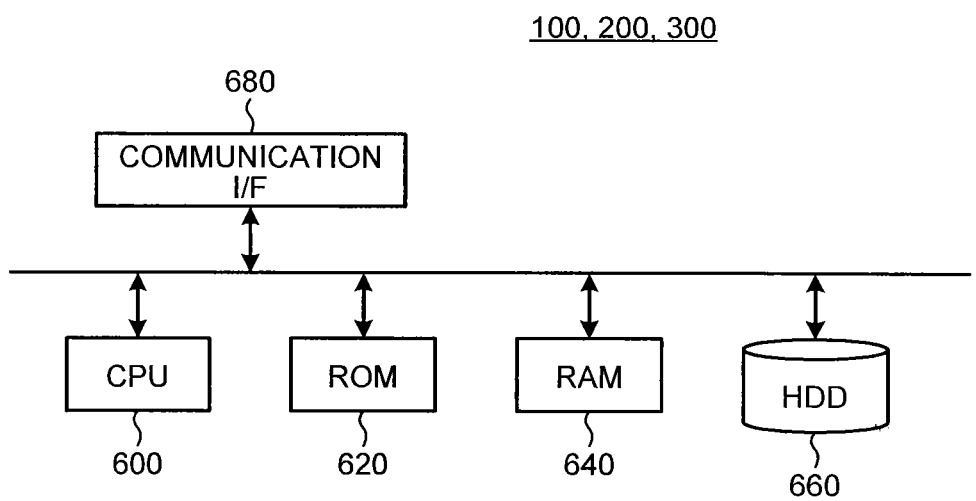
FIG. 22 is a block diagram illustrating a hardware configuration of the writing apparatus.

Next, the hardware configuration of the writing apparatus 100, 200, and 300 of the above-described embodiment will be described. FIG. 22 is a block diagram illustrating the hardware configuration of the writing apparatus 100, 200, and 300 of the above-described embodiment.

In the writing apparatus 100, 200, and 300 of the above-described embodiment, a communication interface (I/F) 680, a CPU (Central Processing Unit) 600, ROM (Read Only Memory) 620, RAM (Random Access Memory) 640, an HDD 660, and so on are mutually connected by bus, which is the hardware configuration utilizing the general computer.

The CPU 600 is a calculation device adapted to control the entire processing of the writing apparatus 100, 200, and 300 of the above-described embodiment. The RAM 640 stores therein the data that is necessary for various processes by the CPU 600. The ROM 620 stores therein the program and the like adapted to implement various processes by the CPU 600. The HDD 660 stores therein the data to be stored in the above-described storage unit (storage unit 51). The communication interface (I/F) 680 is the interface that is connected to an external device and/or an external terminal such as the second writing unit 70 via the communication line and transmits and receives the data to and from the connected external device and/or the external terminal.

It is noted that the program for executing the above-described various process executed by the writing apparatus 100, 200, and 300 of the above-described embodiment is provided embedded in advance into the ROM 620 and the like.

It is noted that the program executed by the writing apparatus 100, 200, and 300 of the above-described embodiment may be provided by the computer readable medium, in which the program is recorded, such as a CD-ROM, a flexible disk (FD), a CD-R, a DVD (Digital Versatile Disk), and the like in the form that is installable or executable in the writing apparatus 100, 200, and 300 of the above-described embodiment.

Further, the program executed by the writing apparatus 100, 200, and 300 of the above-described embodiments may be configured to be provided by storing it in the computer connected to the network such as the Internet and causing it to be downloaded via the network. Further, the program executed by the writing apparatus 100, 200, and 300 of the above-described embodiments may be configured to be provided or delivered via the network such as the Internet.

The program executed by the writing apparatus 100, 200, and 300 of the above-described embodiments has a module configuration including the above-described respective units (the determination unit 50A, the notification unit 50B, the storage control unit 50C, the write control unit 50D, the read control unit 50E, the notification unit 52B, and the write control unit 53D). The actual hardware is configured so that the CPU 600 reads out various programs from the ROM 620 and the like and executes them, which causes the above-described respective units to be loaded on a main storage device and the above-described functional configuration to be generated on the main storage device.

The present invention has the advantage of allowing for the prompt and easy recovery when the write abnormality occurs.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A writing apparatus to which a predetermined writer is connected, comprising:
a writer configured to write, to a write object provided to a conveyed item conveyed in a conveying direction, at least identification information that identifies the write object based on stored identification information;
a first reader provided downstream in the conveying direction from the writer and configured to read the identification information from the write object;
a determiner configured to determine whether or not the identification information written to the write object and read by the first reader is consistent with the stored identification information to be written to the write object;
a notifier configured to, when the determiner determines that the identification information written to the write object and read by the first reader is inconsistent with the stored identification information to be written to the write object, notify the predetermined writer of recovery information including at least one of the stored identification information to be written to the write object or a write content corresponding to the stored identification information to be written to the write object;
a memory configured to store the stored identification information and the write content corresponding to the stored identification information so that a predetermined writing order can be identified; and
a storage controller configured to, when consistency is determined by the determiner, store completion information indicating a normal write in the memory and associating it with the identification information read by the first reader that was determined to be inconsistent,
wherein the writer writes at least the identification information based on the stored identification information in the predetermined writing order to a corresponding write object provided to each of a plurality of conveyed items conveyed in the conveying direction, and
wherein, when the determiner determines that the identification information written to the write object and read by the first reader is inconsistent with the stored identification information to be written to the write object, the notifier notifies the predetermined writer of recovery information containing at least one of the stored identification information that is not associated with the completion information in the memory and has an earlier writing order or the write content corresponding to the stored identification information, as the stored identification information and the write content to be written to the write object.

2. The writing apparatus according to claim 1, wherein when the determiner determines that the identification information written to the write object and read by the first reader is inconsistent with the stored identification information to be written to the write object, the writer writes, to another write object provided to another conveyed item that is upstream in the conveying direction from the conveyed item, position information indicating a relative position in relation to the conveyed item.

3. The writing apparatus according to claim 1, wherein the predetermined writer writes the stored identification information and the write content contained in the recovery information to the write object.

4. The writing apparatus according to claim 1, wherein the writer includes a controller configured to move an orientation control mirror via an orientation control motor to adjust an irradiation position of laser light of the writer.

5. The writing apparatus according to claim 4, wherein the controller is configured to adjust a radiation power of the laser light to control a stroke width of an output of the writer.

6. The writing apparatus according to claim 1, further comprising a controller that includes the notifier and the determiner, wherein the controller is configured to transmit a writing instruction to the writer, wherein the writing instruction includes irradiation position information and radiation power information for writing the identification information to the write object.

7. The writing apparatus according to claim 1, wherein when the determiner determines that the identification information written to the write object and read by the first reader is inconsistent with the stored identification information to be written to the write object, the writer erases already-written information before the predetermined writer is to write.

8. The writing apparatus according to claim 1, wherein when the determiner determines that the identification information written to the write object and read by the first reader is inconsistent with the stored identification information to be written to the write object, the notifier notifies the predetermined writer of a first identification information written to the write object as the identification information, and a second identification information, which is already written to the write object, at a same time.

9. The writing apparatus according to claim 1, wherein when a writing format of the writer is different from that of the predetermined writer, the notifier notifies information that the predetermined writer can use as the recovery information.

10. The writing apparatus according to claim 1, wherein the written identification information includes character data and code data.

11. A writing system comprising a writing apparatus and a second writer connected to the writing apparatus,
wherein the writing apparatus includes
a first writer configured to write, to a write object provided to a conveyed item conveyed in a conveying direction, at least identification information that identifies the write object based on stored identification information,
a first reader provided downstream in the conveying direction from the first writer and configured to read the identification information from the write object,
a determiner configured to determine whether or not the identification information written to the write object and read by the first reader is consistent with the stored identification information to be written to the write object,
a notifier configured to, when the determiner determines that the identification information written to the write object and read by the first reader is inconsistent with the stored identification information to be written to the write object, notify the second writer of recovery information including at least one of the stored identification information to be written to the write object or a write content corresponding to the stored identification information to be written to the write object,
a memory configured to store the stored identification information and the write content corresponding to the stored identification information so that a predetermined writing order can be identified, and
a storage controller configured to, when consistency is determined by the determiner, store completion information indicating a normal write in the memory and associating it with the identification information read by the first reader that was determined to be inconsistent,
wherein the first writer writes at least the identification information based on the stored identification information in the predetermined writing order to a corresponding write object provided to each of a plurality of conveyed items conveyed in the conveying direction,
wherein, when the determiner determines that the identification information written to the write object and read by the first reader is inconsistent with the stored identification information to be written to the write object, the notifier notifies the second writer of recovery information containing at least one of the stored identification information that is not associated with the completion information in the memory and has an earlier writing order or the write content corresponding to the stored identification information, as the stored identification information and the write content to be written to the write object, and
wherein the second writer is provided downstream in the conveying direction from the first reader and writes the stored identification information and the write content contained in the recovery information to the write object.

12. A writing method in a writing apparatus to which a predetermined writer is connected, the writing apparatus including a writer configured to write, to a write object provided to a conveyed item conveyed in a conveying direction, at least identification information that identifies the write object based on stored identification information, and a first reader provided downstream in the conveying direction from the writer and configured to read the identification information from the write object,
the writing method comprising:
determining whether or not the identification information written to the write object and read by the first reader is consistent with the stored identification information to be written to the write object;
when it is determined that the identification information written to the write object and read by the first reader is inconsistent with the stored identification information to be written to the write object, notifying the predetermined writer of recovery information including at least one of the stored identification information to be written to the write object or a write content corresponding to the stored identification information to be written to the write object;
storing, in a memory, the stored identification information and the write content corresponding to the stored identification information so that a predetermined writing order can be identified;
when consistency is determined, storing completion information indicating a normal write in the memory and associating it with the identification information read by the first reader that was determined to be inconsistent;
writing at least the identification information based on the stored identification information in the predetermined writing order to a corresponding write object provided to each of a plurality of conveyed items conveyed in the conveying direction; and
when it is determined that the identification information written to the write object and read by the first reader is inconsistent with the stored identification information to be written to the write object, notifying the predetermined writer of recovery information containing at least one of the stored identification information that is not associated with the completion information in the memory and has an earlier writing order or the write content corresponding to the stored identification information, as the stored identification information and the write content to be written to the write object.

* * * * *